US008533947B2

(12) United States Patent
Moreland

(10) Patent No.: US 8,533,947 B2
(45) Date of Patent: Sep. 17, 2013

(54) METHOD OF FORMING A TURBINE ENGINE COMPONENT

(75) Inventor: Thomas R. Moreland, Diamond, OH (US)

(73) Assignee: PCC Airfoils, Inc., Beachwood, OH (US)

( * ) Notice: Subject to any disclaimer, the term of this patent is extended or adjusted under 35 U.S.C. 154(b) by 324 days.

(21) Appl. No.: 12/914,287

(22) Filed: Oct. 28, 2010

(65) Prior Publication Data

US 2012/0102735 A1    May 3, 2012

(51) Int. Cl.
*B21K 25/00*    (2006.01)

(52) U.S. Cl.
USPC ..................... 29/889.2; 29/889.22

(58) Field of Classification Search
USPC ............ 29/281.1, 889.2; 165/45; 425/174.4; 164/10, 34, 35, 516; 269/37
See application file for complete search history.

(56) References Cited

U.S. PATENT DOCUMENTS

| 3,636,609 | A | * | 1/1972 | Stahl ............................... 269/37 |
| 3,854,832 | A | * | 12/1974 | Cowper ......................... 403/349 |
| 4,575,330 | A | * | 3/1986 | Hull ............................ 425/174.4 |
| 4,728,258 | A | * | 3/1988 | Blazek et al. ................. 415/137 |
| 4,844,144 | A | | 7/1989 | Murphy et al. |
| 4,987,944 | A | * | 1/1991 | Parks ............................... 164/10 |
| 5,069,265 | A | * | 12/1991 | Blazek ............................. 164/35 |
| 5,141,680 | A | | 8/1992 | Almquist et al. |
| 5,164,128 | A | | 11/1992 | Modrek et al. |
| 5,391,460 | A | | 2/1995 | Dougherty et al. |
| 5,439,622 | A | | 8/1995 | Pennisi et al. |
| 5,474,419 | A | | 12/1995 | Reluzco et al. |
| 5,503,218 | A | * | 4/1996 | Campion et al. ............. 164/516 |
| 5,586,864 | A | | 12/1996 | Knorowski et al. |
| 5,735,336 | A | | 4/1998 | Oti |
| 7,077,638 | B2 | | 7/2006 | Leyden et al. |
| 7,520,740 | B2 | | 4/2009 | Wahlstrom et al. |

* cited by examiner

*Primary Examiner* — David Bryant
*Assistant Examiner* — Lee Holly
(74) *Attorney, Agent, or Firm* — Tarolli, Sundheim, Covell & Tummino LLP

(57) ABSTRACT

The present invention provides a new and improved method of forming a turbine engine component having a plurality of airfoils disposed in an annular array between inner and outer shroud rings. The method includes forming inner and outer shroud ring patterns. The inner and outer shroud ring patterns may advantageously be formed by solid freeform fabrication techniques, such as stereolithography. An assembly fixture may be utilized to position the inner and outer shroud rings and an array of airfoils in a coaxial relationship. When the inner and outer shroud rings are to be assembled, axially inner and outer shroud ring patterns may be interconnected by providing relative rotation between annular sections of the shroud ring patterns. In addition, adhesive may be utilized to interconnect the sections of the shroud ring patterns.

45 Claims, 10 Drawing Sheets

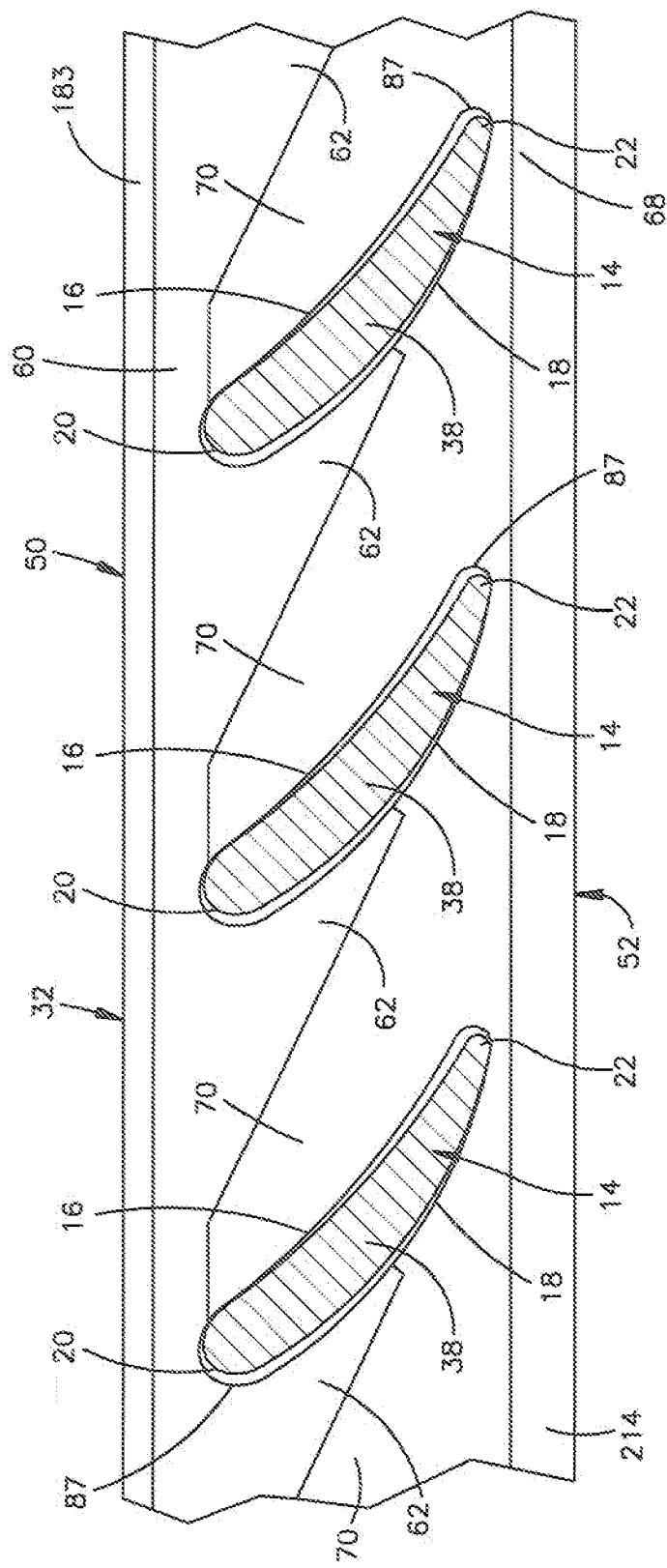

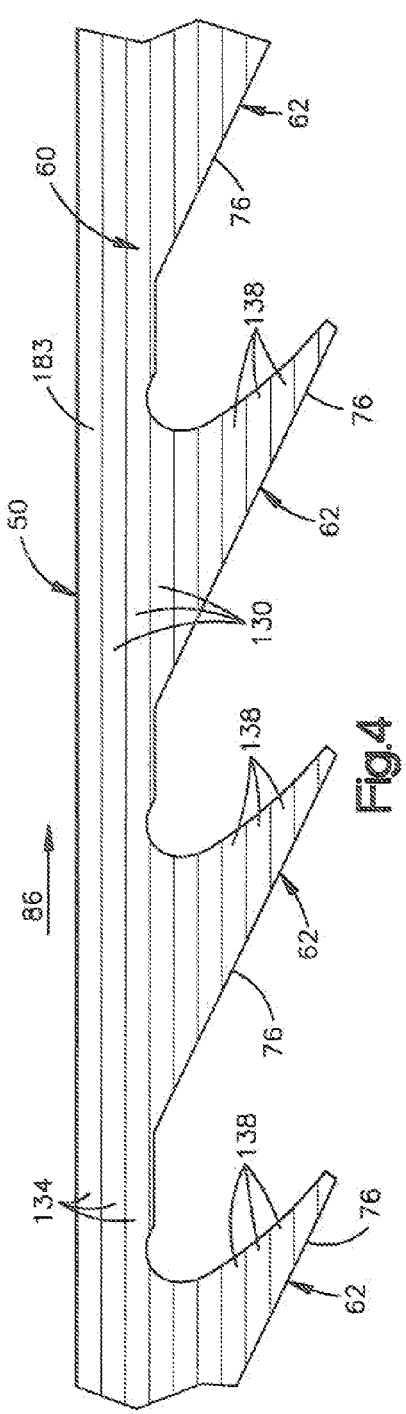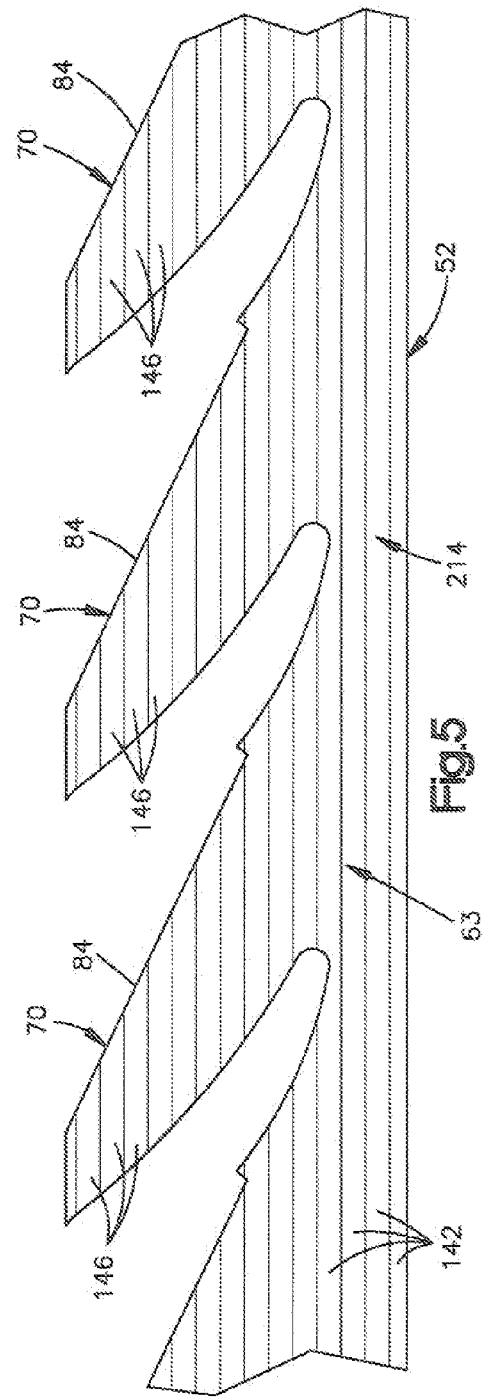

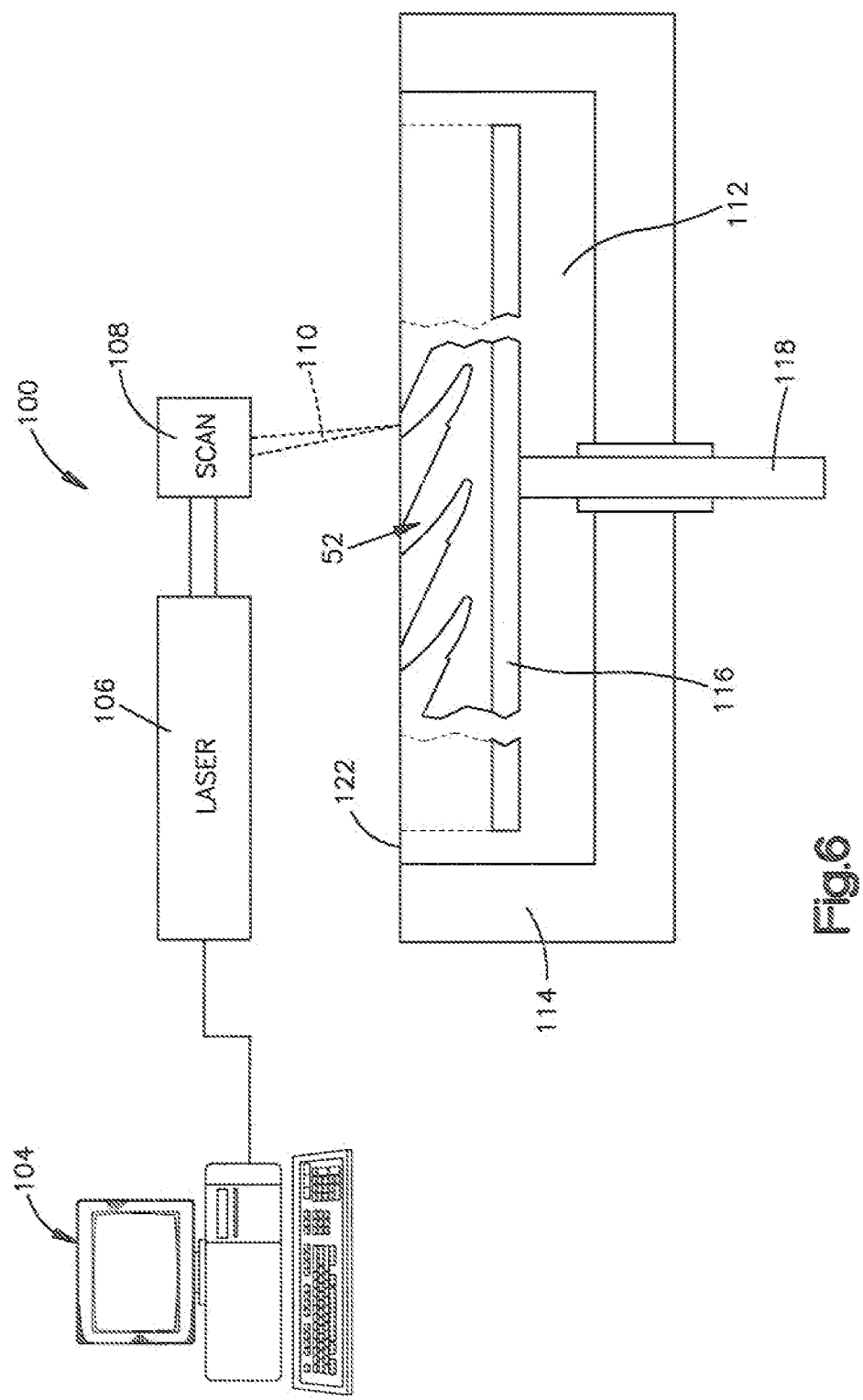

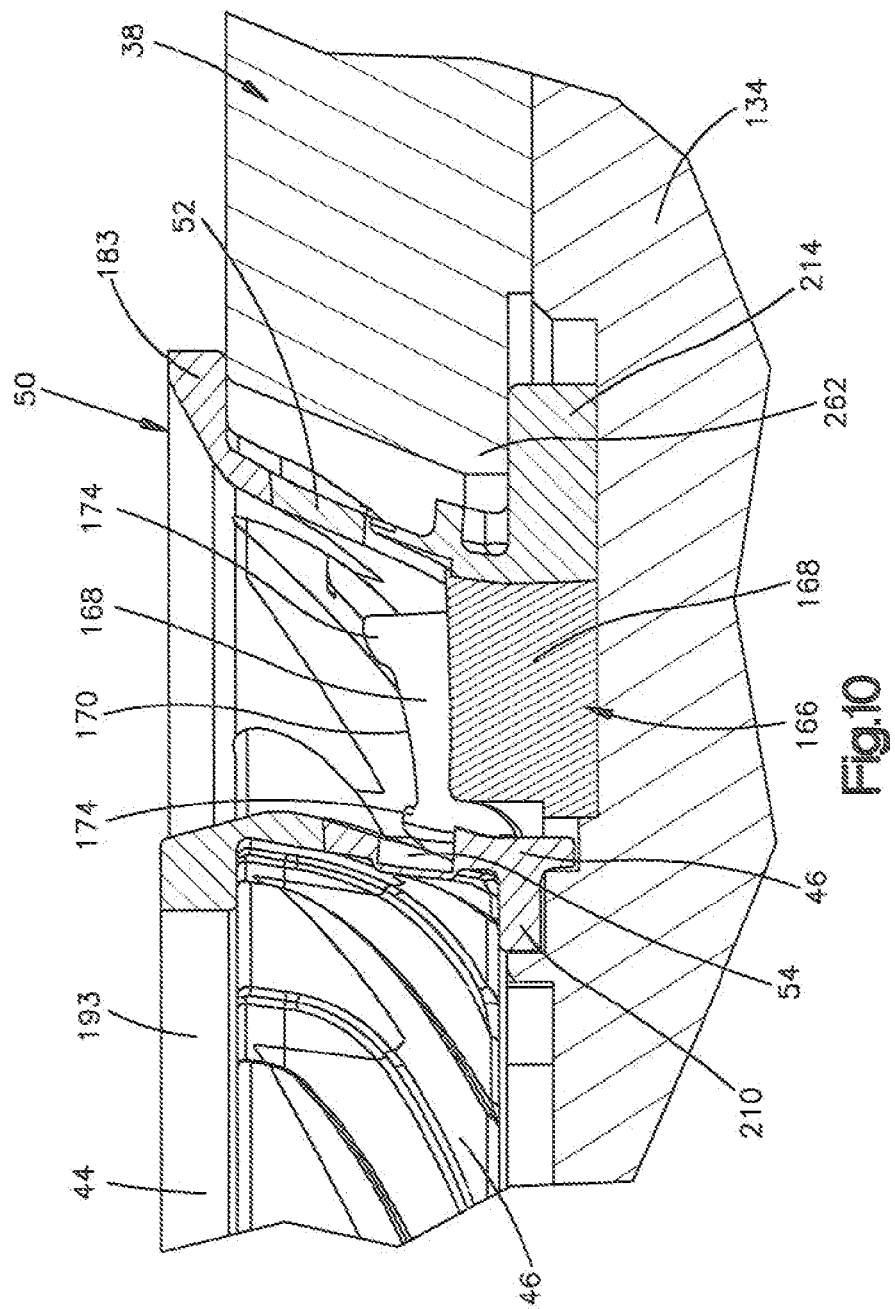

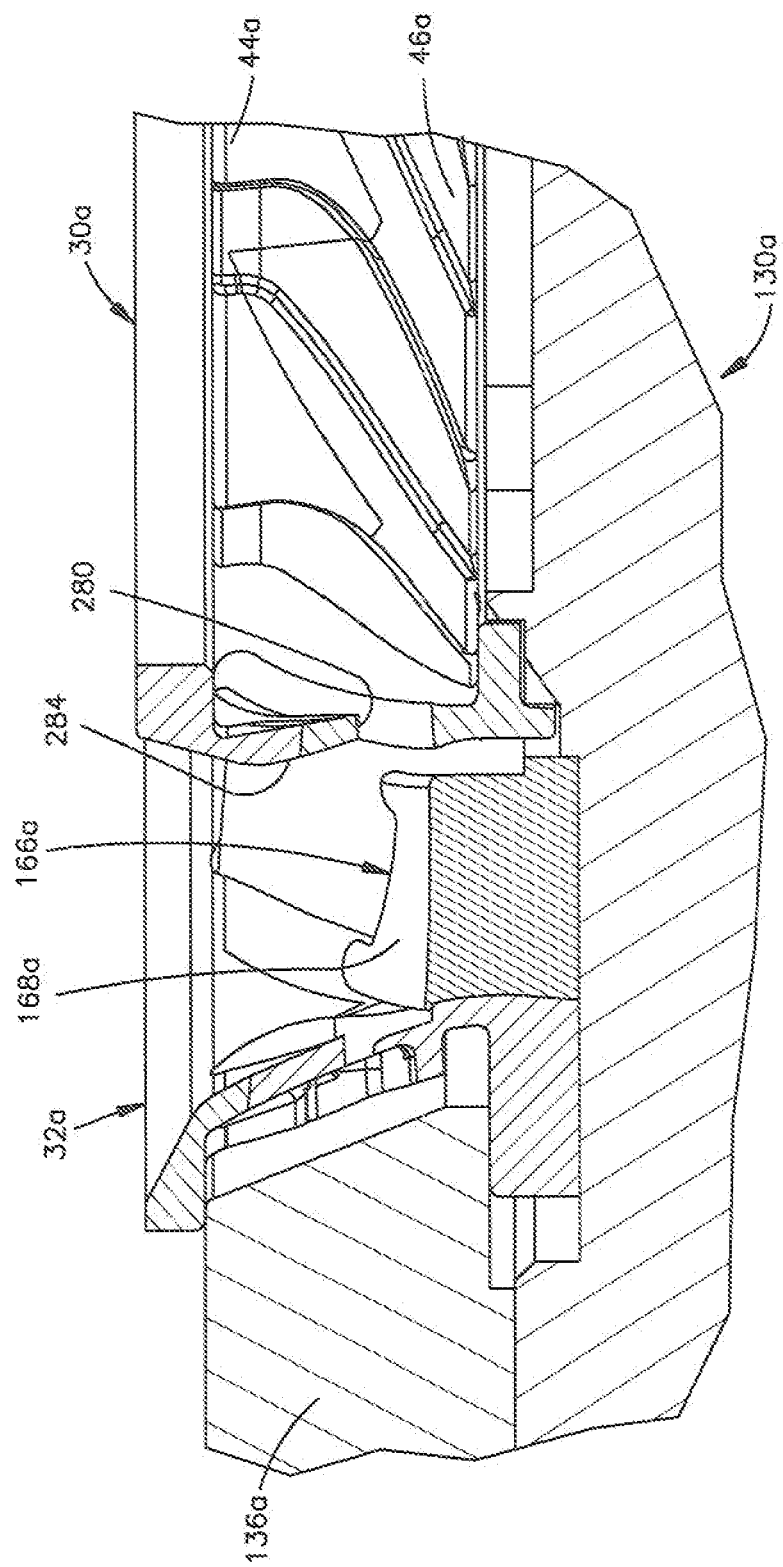

METHOD OF FORMING A TURBINE ENGINE COMPONENT

BACKGROUND OF THE INVENTION

The present invention relates to a method of making a turbine engine component having a plurality of airfoils disposed in an annular array between inner and outer shroud rings.

A known turbine engine component is disclosed in U.S. Pat. No. 4,728,258. This patent discloses making a turbine engine component having airfoils disposed in an annular array between inner and outer shroud rings. In making the turbine engine component, preformed metal airfoils are placed in an annular array with end portions of the airfoils embedded in inner and outer shroud ring patterns formed of wax. The wax shroud ring patterns are covered with ceramic mold material to form a mold. The inner and outer shroud ring patterns are then removed to leave inner and outer shroud ring mold cavities in which inner and outer end portions of the airfoils are disposed.

SUMMARY OF THE INVENTION

An improved method is provided to form a turbine engine component having a plurality of airfoils disposed in an annular array between inner and outer shroud rings. If desired, an inner shroud ring pattern may be formed by sequentially forming cross sectional layers of the inner shroud ring pattern and interconnecting the cross sectional layers of the inner shroud ring pattern. Similarly, it may be desired to have an outer shroud ring pattern formed by sequentially forming cross sectional layers of the outer shroud ring pattern and interconnecting the cross sectional layers of the outer shroud ring pattern.

After a plurality of airfoils have been positioned in an annular array which extends between the shroud ring patterns, the shroud ring patterns are covered with a ceramic mold material. The inner and outer shroud ring patterns are then removed from the covering of ceramic mold material to leave inner and outer shroud ring mold cavities having configurations corresponding to the configurations of inner and outer shroud ring patterns. The mold cavities are filled with molten metal which is solidified to form inner and outer shroud rings.

If desired, the inner and/or outer shroud ring patterns may be formed of a plurality of sections. The sections of the inner shroud ring pattern may be interconnected with portions of the airfoils in the array of airfoils disposed between the shroud ring pattern sections. Similarly, the sections of the outer shroud ring pattern may be interconnected with portions of the airfoils in the array of airfoils disposed between the shroud ring pattern sections. It may be desired to interconnect the sections of the inner shroud ring pattern by providing relative rotation between the sections of the inner shroud ring pattern. Similarly, it may be desired to interconnect the sections of the outer shroud ring pattern by providing relative rotation between the sections of the outer shroud ring pattern.

The present invention includes many different features which may be utilized together in the manner described herein. However, it is also contemplated that the various features of the invention may be utilized separately, or in different combinations with each other, and/or in combination with features from the prior art.

BRIEF DESCRIPTION OF THE DRAWINGS

The foregoing and other features of the invention will become more apparent upon a consideration of the following description taken in connection with the accompanying drawings wherein:

FIG. 3 is an enlarged fragmentary schematic side elevational view of a portion of FIG. 1 and illustrating the outer shroud ring pattern and radially outer end portions of airfoils disposed in the annular array of airfoils;

FIG. 4 is an enlarged fragmentary schematic illustration depicting the manner in which one section of the outer shroud ring pattern of FIGS. 1-3 is formed with a layered construction;

FIG. 5 is an enlarged fragmentary schematic illustration, generally similar to FIG. 4, illustrating the manner in which another section of the outer shroud ring pattern is formed with a layered construction;

FIG. 6 is a schematic illustration depicting the forming of the shroud ring pattern section illustrated in FIG. 5 with a layered construction;

FIG. 10 is an enlarged fragmentary schematic sectional view, taken generally along another portion of the line 8-8 of FIG. 7, further illustrating the manner in which an outer retaining member in the fixture assembly engages an outer shroud ring pattern; and FIG. 11 is an enlarged fragmentary schematic sectional view, generally similar to FIG. 9, illustrating an embodiment in which an opening is formed in the inner shroud ring pattern to receive a portion of an airfoil.

DESCRIPTION OF SPECIFIC PREFERRED EMBODIMENTS OF THE INVENTION

General Description

Figure 1:
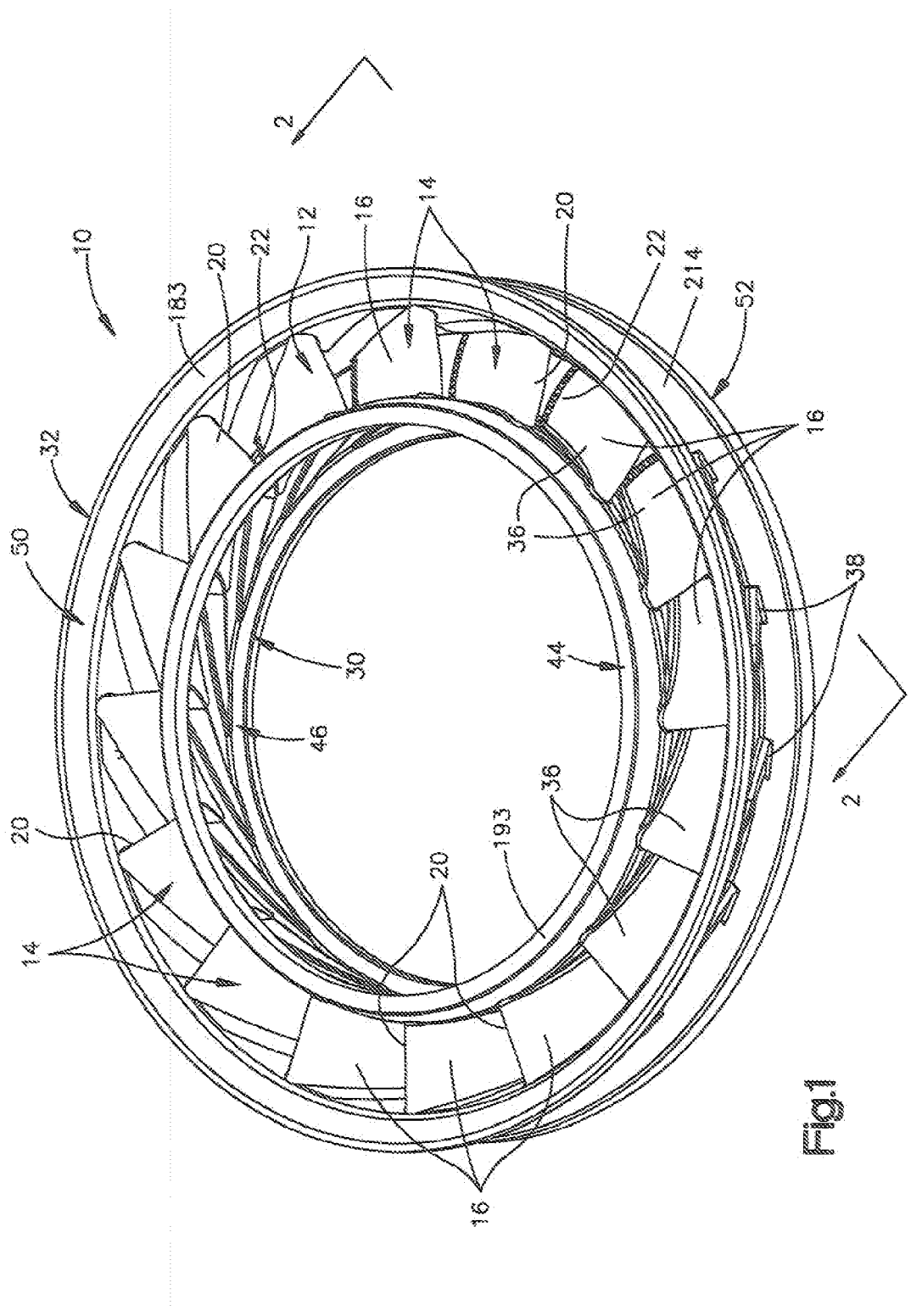
FIG. 1 is a schematic pictorial illustration depicting the relationship of inner and outer shroud ring patterns to an annular array of airfoils.
Figure 2:
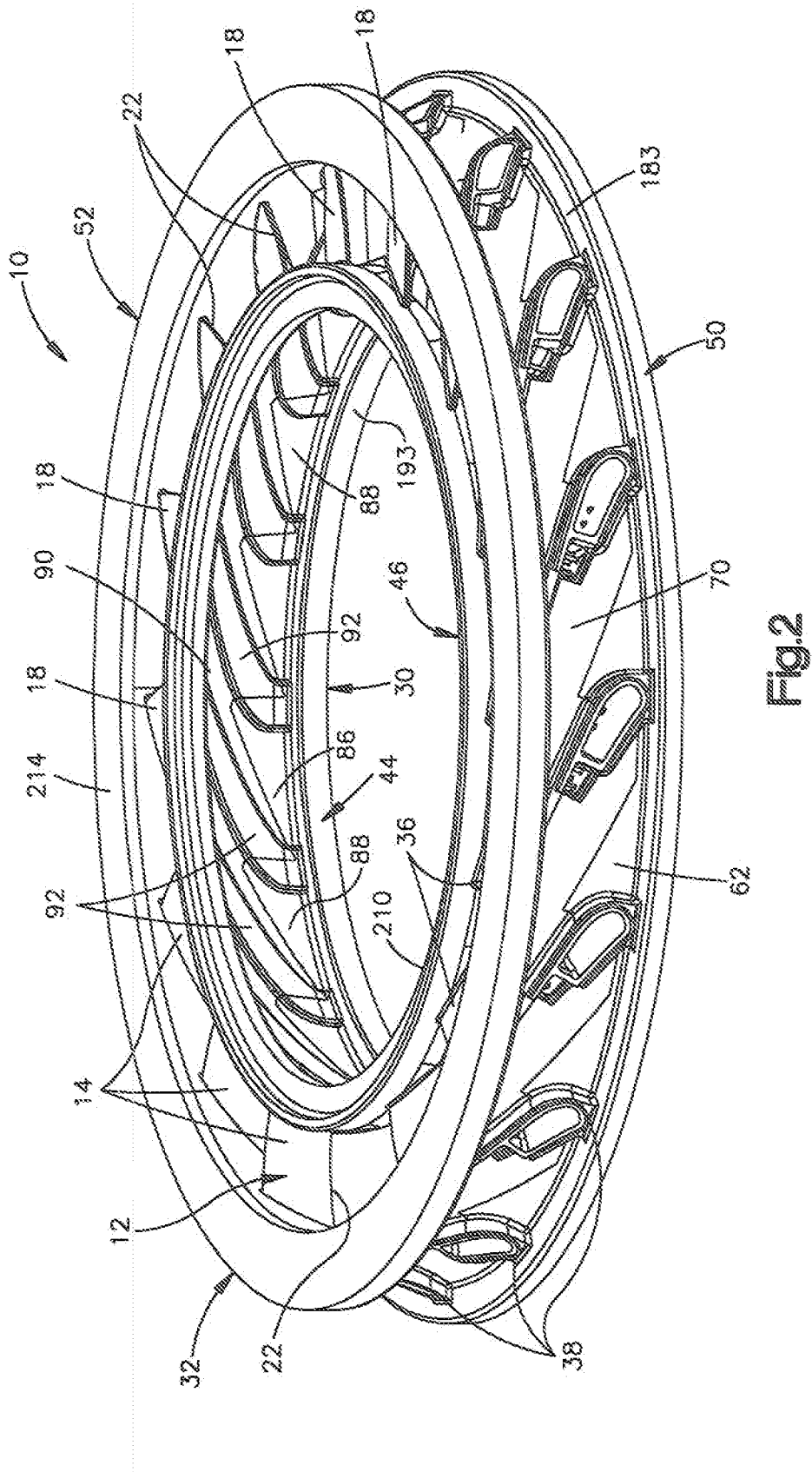
FIG. 2 is a schematic pictorial illustration, taken generally along the line 2-2 of FIG. 1, further depicting a relationship of the inner and outer shroud ring patterns to the array of airfoils.

An apparatus 10 for use in casting a turbine engine component is illustrated schematically in FIGS. 1 and 2. The apparatus 10 includes an annular array 12 of preformed airfoils 14. The airfoils 14 may be hollow vanes which are cast from a nickel chrome super alloy and contain airflow passages. However, the airfoils 14 may be solid and/or formed of a different material if desired. For example, the airfoils 14 may be formed of a ceramic material. If desired, the airflow passages in the airfoils 14 may be eliminated.

The illustrated preformed metal airfoils 14 have an equiaxed crystallographic structure. However, it is contemplated that the metal airfoils 14 may have a columnar grained or single crystal crystallographic structure. The airfoils 14 have a known construction and include arcuately curving concave side surfaces 16 (FIG. 1) and arcuately curving convex side surfaces 18 (FIG. 2). The concave and convex side surfaces 16 and 18 extend between leading edge portions 20 (FIG. 1) and trailing edge portions 22 (FIGS. 1 and 2) of the airfoils 14.

During the forming of a turbine engine component, the annular array 12 of airfoils 14 extend between annular inner and outer shroud ring patterns 30 and 32 (FIGS. 1 and 2). Radially inner end portions 36 of the hollow airfoils 14 are connected with the circular inner shroud ring pattern 30. Similarly, radially outer end portions 38 of the hollow airfoils 14 are connected with the circular outer shroud ring pattern 32. The annular array 12 of airfoils 14 extends between and is coaxial with the annular inner and outer shroud ring patterns 30 and 32. The inner and outer shroud ring patterns 30 and 32 are disposable and are utilized to form cavities in which metal shroud rings are cast.

In the illustrated embodiment of the invention, the airfoils 14 are formed of metal. The inner and outer shroud ring patterns 30 and 32 are formed of a polymeric material. However, the airfoils 14 and/or inner and outer shroud ring patterns 30 and 32 may be formed of different materials if desired. It should be understood that the inner and outer shroud ring patterns 30 and 32 are disposable. The shroud ring patterns 30 and 32 are used, during the forming of a turbine engine component, to form mold cavities in which molten metal is cast to form inner and outer shroud rings.

In accordance with one of the features of the invention, the inner and outer shroud ring patterns 30 and 32 are both formed by a plurality of sections. Thus, the inner shroud ring pattern 30 includes a first annular pattern section 44 (FIGS. 1 and 2) and a second annular pattern section 46. Similarly, the outer shroud ring annular pattern 32 includes a first annular pattern section 50 and a second pattern section 52 (FIGS. 1 and 2).

If desired, the inner and outer shroud ring patterns 30 and 32 may be formed with either a greater or lesser number of pattern sections. For example, inner shroud ring pattern 30 may be formed as one piece. As another example, the inner shroud ring pattern 30 may be formed as three pieces with an intermediate pattern section disposed between the first and second pattern sections 44 and 46. Similarly, the outer shroud ring pattern 32 (FIGS. 2 and 3) may be formed as one piece. As another example, the outer shroud ring pattern 32 may be formed as three pieces with an intermediate pattern section disposed between the first and second pattern sections 50 and 52.

In the illustrated embodiment of the invention, the inner and outer shroud ring patterns 30 and 32 have similar constructions. That is, they have the same number of pattern sections which are interconnected in the same way. However, it is contemplated that the inner and outer shroud ring patterns 30 and 32 may have different constructions and be interconnected in different ways if desired. For example, the outer shroud ring pattern 32 may have a greater number of pattern sections than the inner shroud ring pattern 30.

The airfoils 14 have radially inner and outer end portions 36 and 38 (FIGS. 1 and 2) which are connected with the inner and outer shroud ring patterns 30 and 32. In the embodiment of the invention illustrated in FIGS. 1 and 2, part of the radially outer end portions 38 of the airfoils 14 extend radially through the outer shroud ring pattern 32. The portions of the airfoils 14 that extend radially through the outer shroud ring pattern 32 are disposed between the first and second sections 50 and 52 of the outer shroud ring pattern 32.

The radially inner end portions 36 of the airfoils 14 do not extend through the inner shroud ring pattern 30. The radially inner end portions 36 of the airfoils 14 are disposed in recesses or pockets 54 (FIG. 9) in the inner shroud ring pattern 30. The radially inner end portions 36 of the airfoils 14 may extend through the inner shroud ring pattern 30 if desired. The portions of the airfoils 14 that are disposed in the recesses or pockets 54 in the inner shroud ring pattern 30 are, at least partially, disposed between the first and second sections 44 and 46 of the inner shroud ring pattern 30.

It is contemplated that the airfoils 14 may be connected with the inner and/or outer shroud ring patterns 30 and 32 (FIGS. 1 and 2) in a different manner if desired. For example, portions of the radially inner end portions 36 of the airfoils 14 may extend through the inner shroud ring pattern 30. As another example, the radially outer end portions 38 of the airfoils 14 may not extend through the outer shroud ring pattern 32. If desired, both of the end portions 36 and 38 of the airfoils 14 may be received in recesses in the shroud ring patterns 30 and 32. Alternatively, the end portions 36 and 38 of the airfoils 14 may extend through openings in both of the shroud ring patterns 30 and 32.

Shroud Ring
Pattern Sections

In accordance with another feature of the invention, the shroud ring pattern sections 44, 46, 50 and 52 are formed so that they can be interconnected upon the occurrence of relative rotation between the pattern sections. Thus, the first and second pattern sections 44 and 46 of the inner shroud ring pattern 30 are interconnected by providing relative rotation between the pattern sections. Similarly, the first and second pattern sections 50 and 52 of the outer shroud ring pattern 32 are interconnected by providing relative rotation between the first and second pattern sections. Adhesive is utilized to secure the sections 44 and 46 of the inner shroud ring pattern 30 against relative movement. Similarly, adhesive is utilized to secure the sections 50 and 52 of the outer shroud ring pattern 32 against relative movement. However, fasteners other than adhesive may be utilized to interconnect the inner shroud ring pattern sections 44 and 46 and to interconnect the outer shroud ring pattern sections 50 and 52.

In the illustrated embodiment of the invention, the sections 44 and 46 of the inner shroud ring pattern 30 and the sections 50 and 52 of the outer shroud ring pattern 32 are formed with annular body portions having axially extending projections. The axially extending projections from the body portions of the first and second pattern sections 44 and 46 of the inner shroud ring patterns 30 interact with each other to interconnect the first and second pattern sections 44 and 46. Similarly, the axially extending projections from the body portions of the first and second pattern sections 50 and 52 of the outer shroud ring pattern 32 interact with each other to interconnect the first and second pattern sections 50 and 52. If desired, the projections on one or more of the pattern sections may extend radially from the annular body portions of the shroud ring pattern sections.

The projections on the inner pattern sections 44 and 46 are constructed so as to become interconnected upon the occurrence of relative rotation between the inner pattern sections. Similarly, the projections on the outer pattern sections 50 and 52 are constructed so as to become interconnected upon the occurrence of relative rotation between the outer pattern sections. Although the illustrated projections on the shroud ring pattern sections 44, 46, 50 and 52 extend axially from the body portions of the shroud ring pattern sections, one or more of the projections could extend radially from the body portions of the shroud ring pattern sections.

It is contemplated that the pattern sections 44 and 46 and/or the pattern sections 50 and 52 may be interconnected in a different manner if desired. For example, the pattern sections 44 and 46 and/or the pattern sections 50 and 52 may be interconnected when linear movement occurs between the pattern sections. As another example, the pattern sections 44 and 46 and/or the pattern sections 50 and 52 may be interconnected with mechanical fasteners which snap and/or hook together.

The construction of the outer shroud ring pattern 32 is illustrated schematically in FIG. 3. The outer shroud ring pattern 32 includes the first or upper (as viewed in FIG. 3) pattern section 50 and the second or lower pattern section 52. The first pattern section 50 includes an annular body portion 60 from which a plurality of projections 62 extend axially downward (as viewed in FIG. 3). The projections 62 extend downward along the central axis of the annular body portion 60. Central axes of the projections 62 are skewed at an acute angle to the central axis of the body portion 60.

Similarly, the second or lower (as viewed in FIG. 3) pattern section 52 includes an annular body portion 68. A plurality of projections 70 extend axially upward (as viewed in FIG. 3) along the central axis of the annular body portion 68. Central axes of the projections 70 are skewed at an acute angle to the central axis of the body portion 68. The central axes of the projections 62 and 70 are skewed in opposite directions. Thus, the central axes of the projections 62 are skewed downward and rightward (as viewed in FIG. 3) while the central axes of the projections 70 are skewed upward and leftward.

When the first and second pattern sections 50 and 52 of the outer shroud ring pattern 32 are to be interconnected, the pattern sections are positioned in a coaxial relationship relative to each other. One of the pattern sections, for example, the first pattern section 50, is then moved toward the other pattern section, in the example, the second pattern section 52. As this occurs, the projections 62 and 70 interdigitate and become interlocked as relative rotation occurs between the first and second pattern sections 50 and 52. The interlocking pattern sections 50 and 52 extend around and partially enclose the radially outer end portions 38 of the airfoils 14.

The projections 62 from the annular body portion 60 of the first pattern section 50 (FIG. 4) have cam surfaces 76 which extend downward and toward the right (as viewed in FIG. 4). The cam surfaces 76 on the projections 62 of the first pattern section 50 engage cam surfaces 84 (FIG. 5) on projections 70 of the second pattern section 52. The cam surfaces 84 on the second pattern section 52 slope upward and toward the left (as viewed in FIG. 5).

When the sloping cam surfaces 76 and 84 on the first and second pattern sections 50 and 52 (FIGS. 4 and 5) are moved axially toward each other, the cam surfaces cooperate to promote relative rotation between the first and second pattern sections. Thus, if it is assumed that the second pattern section 52 (FIG. 5) is held against movement and the first pattern section 50 (FIG. 4) is moved straight downward toward the second pattern section, the cam surfaces 76 on the projections 62 of the first pattern section will engage the cam surfaces 84 on the projections 70 of the second pattern section 52.

Downward force applied to the first pattern section 50 will cause the cam surfaces 76 on the projections 62 of the first pattern section to slide downward and rightward (as viewed in FIG. 5) along the cam surfaces 84 on the projections 70 of the second pattern section 52. This sliding movement is promoted by manually rotating the first pattern section 50 in the direction of the arrow 86 (FIG. 4). This results in the first pattern section 50 being rotated in the direction of the arrow 86 in FIG. 4 while the second pattern section 52 is held against movement. As this occurs, there is a meshing engagement of the projections 62 on the first pattern section 50 with the projections 70 on the second pattern section 52. This results in the first pattern section 50 moving to the position shown in FIG. 3 relative to the second pattern section 52.

As the first pattern section 50 is moved downwardly (as viewed in FIG. 4) toward the second pattern section 52 and is rotated, the first and second pattern sections cooperate to define openings 87 (FIG. 3) in which portions of the radially outer end portions 38 of the airfoils 14 are received. The radially outer end portions 38 of the airfoils 14 are then at least partially disposed between portions of the first and second pattern sections 50 and 52 of the outer shroud ring pattern 32.

In the foregoing description, it was assumed that the second pattern section 52 was held against rotation and the first pattern section 50 was moved downwardly and rotated to the position shown in FIG. 3. However, the first pattern section 50 may be held against rotation and the second pattern section 52 moved toward (upwardly as viewed in FIG. 3) the first pattern section. As this occurs, the cam surfaces 84 on the projection 70 (FIG. 5) on the second pattern section 52 will slide along the cam surfaces 76 on the projections 62 (FIG. 4) on the first pattern section 50. The second pattern section 52 will move into meshing engagement with the first pattern section 50 to define the openings 87 in which the radially outer end portions 38 of the airfoils 14 are received.

The first and second pattern sections 50 and 52 may be secured so as to hold them against movement relative to each other once they have been moved to the positions shown in FIG. 3. It is contemplated that a suitable adhesive may be utilized to hold the pattern sections 50 and 52 against movement relative to each other. This adhesive may, if desired, be applied to the cam surfaces 76 and 84 (FIGS. 4 and 5) on the projections 62 and 70. Alternatively, small bodies of adhesive may be applied to the outer shroud ring pattern 32 at joints formed between the first and second section pattern sections 50 and 52. This adhesive may span the joints formed between the first and second pattern sections 50 and 52 (FIG. 3) and may be applied to the radially outer and/or inner side of the outer shroud ring pattern 32.

The first and second pattern sections 50 and 52 may be constructed so as to securely interlock as they are moved into engagement. This may be accomplished by latching portions formed on the projections 62 and/or 70. For example, a detent on one of the pattern sections 50 or 52 may move into a recess or opening formed in the other pattern section. If desired, separate mechanical fasteners may be utilized to interconnect the pattern sections 50 and 52.

Although only the first and second pattern sections 50 and 52 of the outer shroud ring pattern 32 are illustrated in FIGS. 4 and 5, the first and second pattern sections 44 and 46 of the inner shroud ring pattern 30 have the same construction and are interconnected in the same way as the first and second pattern sections 50 and 52 of the outer shroud ring pattern 32. The first inner shroud ring pattern section 44 (FIG. 2) has an annular body portion 86 with projections 88, corresponding to the projections 62 (FIGS. 2 and 4) on the first pattern section 50 of the outer shroud ring pattern 32. The second inner shroud ring pattern section 46 (FIG. 2) has an annular body portion 90 with projections 92, corresponding to the projections 70 (FIGS. 2 and 5) on the second pattern section 52 of the outer shroud ring pattern 32.

The projections 88 and 92 (FIG. 2) on the inner shroud ring pattern sections 44 and 46 cooperate with each other in the same manner as the projections 62 and 70 (FIG. 3) on the outer shroud ring pattern sections 50 and 52. However, the projections 88 and 92 (FIG. 2) on the inner shroud ring pattern sections 44 and 46 do not form openings corresponding to the openings 87 (FIG. 3) formed by the outer shroud ring pattern sections 50 and 52. If desired, the projections 88 and 92 on the inner shroud ring pattern sections could form openings corresponding to the openings 87 formed by the outer shroud ring pattern sections 50 and 52.

The inner and/or outer shroud ring patterns 30 and 32 may be formed either with or without openings corresponding to the openings 87. For example, openings corresponding to the openings 87 may be formed in the inner shroud ring pattern 30 and no openings may be formed in the outer shroud ring pattern. As another example, openings may be formed in both the inner and outer shroud ring patterns 30 and 32. As still another example, openings may be omitted from both the inner and outer shroud ring patterns 30 and 32.

Formation of Shroud
Ring Pattern Sections

In accordance with one of the features of the invention, the inner and outer shroud ring patterns 30 and 32 are formed using solid freeform fabrication techniques. The basic operation of a solid freeform fabrication technique includes slicing of a three dimensional computer model into thin cross sections. The result is translated into two-dimensional position information. The two dimensional position information data is used to control the placement of solid material.

This process is repeated as the sections of the inner and outer shroud ring patterns 30 and 32 are built up one layer at a time. For example, each of the inner shroud ring pattern sections 44 and 46 may be built up in turn. Then each of the outer shroud ring pattern sections 50 and 52 may be built up in turn. The solid freeform fabrication techniques may include electron beam fabrication, fused deposition modeling, laser engineering net shaping, polyjet matrix forming, selective laser centering, solid ground curving, and/or stereolithography.

Although other techniques may be utilized to form the inner and outer shroud ring patterns 30 and 32, a known sterolithography apparatus 100 (FIG. 6) is utilized to sequentially form the first and second pattern sections 44 and 46 of the inner shroud ring pattern 30 and to sequentially form the first and second pattern sections 50 and 52 of the outer shroud ring pattern 32. The pattern sections 44, 46, 50 and 52 are formed one at a time utilizing the stereolithography apparatus 100 of FIG. 6. However, more than one of the pattern sections 44, 46, 50 and/or 52 may be formed at a time if desired.

The known stereolithography apparatus 100 (FIG. 6) includes a computer 104 which is connected with a laser 106. A scanner system (mirrors) 108 directs a laser beam 110 toward a body 112 of liquid in a container 114. The body of liquid 112 is a photopolymer which is ultraviolet light curable. A platform 116 is disposed in the container 114 and is connected with a piston rod 118.

When the stereolithography apparatus 100 is to be utilized to form one of the sections of the inner or outer shroud rings 30 or 32, the piston 118 raises the platform 116 so that the upper surface of the platform is just below the upper surface 122 of the body of ultraviolet curable photopolymer resin 112 in the container 114. Where the laser beam 110 touches the upper surface 122 of the body 112 of liquid, the liquid solidifies. Once a layer of the shroud ring pattern section has been traced, the platform 116 is moved a small distance downward in the body 112 of liquid.

A sweeper bar (not shown) may move across the surface 122 of the previously formed layer, making sure there is an exact amount of the photo sensitive polymer on top of the last layer which was formed. The next layer is then built up upon the previous layer. In this manner, the entire shroud ring pattern section is built.

The stereolithography apparatus 100 has a construction and mode of operation which is similar to the construction and mode of operation disclosed in U.S. Pat. Nos. 4,575,330 and 7,520,740. The disclosures in the aforementioned U.S. Pat. Nos. 4,575,330 and 7,520,740 are hereby incorporated herein in their entirety by this reference thereto. The pattern sections 44, 46, 50 and 52 may be formed, on a commercial basis, using stereolithography techniques, by Express Pattern Inc., having a place of business at 100 Fairway Drive, Vernon Hills, Ill. 60061.

By utilizing the stereolithography apparatus 100 to form the pattern sections of the inner and outer shroud ring patterns 30 and 32, the pattern sections are formed with a layered construction. This layered construction has been illustrated schematically in FIGS. 4 and 5 for the sections 50 and 52 of the outer shroud ring pattern 32. The first pattern section 50 of the outer shroud ring pattern 32 (FIG. 4) has a plurality of layers 130 which have adhered together to form the first pattern section 50.

The first pattern section 50 includes continuous annular layers 134 which are bonded together. In addition, the first pattern section 50 includes discontinuous annular layers 138. Each of the discontinuous annular layers 138 is formed by a plurality of segments which are bonded to the immediately adjacent layers to form the projections 62. The continuous annular layers, that is, annular layers which are uninterrupted, are bonded together to form the annular body portion of the first pattern section 50. The continuous annular layers 134 and the discontinuous annular layers 138 are bonded (adhered) together to form the first pattern section 50 as one piece having a unitary construction.

Similarly, the annular body portion 68 of the second pattern section 52 (FIG. 5) is formed by a plurality of continuous annular layers 142 which are bonded (adhered) together. The projections 70 are formed by discontinuous annular layers 146 which are bonded together. Each of the discontinuous annular layers 146 is formed by a plurality of spaced apart segments which provide for the space between the projections 70. The layers of the second pattern section 52 are bonded together to form the second pattern section 52 as one piece having a unitary construction.

Although only the first and second pattern sections 50 and 52 of the outer shroud ring pattern 32 are illustrated in FIGS. 4 and 5, it should be understood that the first and second pattern sections 44 and 46 of the inner shroud ring pattern 30 are formed in the same way and have the same construction as the first and second pattern sections 50 and 52 of the outer shroud ring pattern. Thus, the first and second pattern sections 44 and 46 of the inner shroud ring pattern 30 are formed by annular layers which are bonded together. Some of the annular layers forming the first and second pattern sections 44 and 46 are continuous while other annular layers forming the first and second pattern sections are discontinuous. This enables the first and second pattern sections 44 and 46 to be formed with body sections made up of continuous annular layers and projections made up of discontinuous annular layers in the same manner as previously described in conjunction with FIGS. 4 and 5.

In the embodiment of the invention illustrated in FIGS. 1-6, the inner and outer shroud ring patterns 30 and 32 are each formed as two pieces. Thus, the inner shroud ring pattern 30 is formed by the first pattern section 44 and the second pattern section 46. Similarly, the outer shroud ring pattern 32 is formed by the first pattern section 50 and second pattern section 52. As was previously mentioned, it is contemplated that the inner and outer shroud ring patterns 30 and 32 may be formed by a greater or lesser number of pieces if desired. For example, the inner shroud ring pattern 30 may be formed as one piece and the outer shroud ring patter 32 may be formed as two or more pieces.

The inner and outer shroud ring patterns 30 and 32 have a layered construction. The layered construction of the first and second pattern sections 50 and 52 of the outer shroud ring pattern 32 are illustrated in FIGS. 4 and 5. The first and second pattern sections 44 and 46 of the inner shroud ring pattern 30 have the same layered construction as the pattern sections of the outer shroud ring pattern 32. The first and second pattern sections of either the inner and/or outer shroud ring pattern may be formed using freeform fabrication techniques other than photobased stereolithography. For example, thermal stereolithography techniques, fused deposition modeling techniques, or selective deposition modeling techniques may be used.

It is contemplated that any one or all of the inner and outer shroud ring patterns may be formed with a construction other than a layered construction. For example, the inner and/or outer shroud ring patterns 30 and/or 32 may be formed as one piece or a plurality of pieces. The piece or pieces of a shroud ring pattern 30 or 32 may be formed by casting. For example, the first and second pattern sections 50 and 52 of the outer shroud ring pattern 50 may be injection molded as one or more pieces using suitable dies. Alternatively, the first and second pattern sections 50 and 52 may be formed as two separate pieces which are cut to form the body sections and projections of each of the pattern sections.

However, it is believed that it may be desired to form the inner and outer shroud ring patterns 30 and 32 with a layered construction utilizing solid freeform fabrication techniques. Rather than utilizing a laser, similar to the laser 106 of FIG. 6 in association with an ultraviolet light curable photopolymer resin, a nozzle may be utilized to form layers of a thermal setting material to form the inner and outer shroud ring patterns 30 and 32. This may be done in a manner similar to that disclosed in U.S. Pat. No. 5,141,680.

Assembly Fixture

In accordance with another feature of the present invention, an assembly fixture 130 (FIG. 7) is utilized to facilitate assembly of the annular array 12 of airfoils 14 and the inner and outer shroud ring patterns 30 and 32. The assembly fixture 130 includes a stationary base 134 on which a plurality of arcuate outer retaining members 136 and 138 are disposed. There are two outer retaining members 136 and 138 having a semicircular configuration. However, a greater number of retaining members, each of which has a smaller arcuate extent, may be provided if desired. The outer retaining members 136 and 138 may have a configuration other than the illustrated arcuate configuration.

The outer retaining members 136 and 138 are fixedly connected to slide bars 140 and 142. The slide bars 140 and 142 are disposed in axially aligned grooves 144 and 148 in the base 134. The grooves 144 and 148 have coincident central axes which extend through and are perpendicular to a central axis of the base 134. The outer retaining members 136 and 138 are engageable with the second pattern section 52 of the outer shroud ring pattern 32 to hold the second pattern section in a desired position relative to the base 134. When the outer retaining members 136 and 138 are in the engaged condition shown in FIG. 7, the centers of curvature of arcuate inner side surfaces the outer retaining members are disposed on the central axis of the coincident central axes of the shroud ring patterns 30 and 32 and the base 134.

A pair of inner retaining members 152 and 154 are disposed in and slidable along a groove 160 (FIG. 7) having a central axis which extends through the central axis of the base 134. The inner retaining members 152 and 154 have coincident central axes which extend through and perpendicular to the central axis of the base 134. The inner retaining members 152 and 154 are engageable with the second pattern section 46 of the inner shroud ring pattern 30 to hold the second pattern section in a desired position relative to the base 134.

The outer retaining members 136 and 138 cooperate with the inner retaining members 152 and 154 to hold the second pattern sections 46 and 52 of the inner and outer shroud ring patterns 30 and 32 in a coaxial relationship. The second pattern sections 46 and 52 are held against movement from a coaxial relationship with the central axis of the assembly fixture 130 by the outer and inner retaining members 136, 138, 152 and 154. The retaining members 136, 138, 152 and 154 hold the second pattern sections against movement relative to the base 134.

An annular array 166 of airfoil positioning ramps 168 is disposed on the base 134 at a location radially inward of the outer retaining members 136 and 138 and radially outward of the inner retaining members 152 and 154. The airfoil positioning ramps 168 position the airfoils 14 relative to each other in the annular array 12 of airfoils. In addition, the airfoil positioning ramps 168 position the airfoils 14 relative to the inner and outer shroud ring patterns 30 and 32.

The airfoil positioning ramps 168 have notches 170. In addition, the airfoil positioning ramps 166 are provided with locating surfaces 174 which engage locating surfaces on trailing edge portions 22 (FIG. 2) the airfoils 14. The locating surfaces on the ramps 168 engage the convex side surfaces 18 of the airfoils 14 to position airfoils relative to each other and relative to the inner and outer shroud ring patterns 30 and 32. If desired, the airfoil positioning ramps 168 may be provided with locating surfaces or projections which engage relatively small portions of an airfoil 14 at positioning locations on the airfoil. Thus, the locating surfaces on the ramps 168 may be formed by projections which engage each airfoil at a plurality of locations to locate the airfoil in the annular array 166 of airfoils.

A pair of clamps 180 and 182 (FIG. 7) are provided on the outer retaining member 136 to engage a circular flange 183 (FIGS. 1 and 7) on the outer shroud ring pattern 32. A second pair of clamps 184 and 186 are provided on the outer retaining member 138. The clamps 184 and 186 engage the circular flange 183 on the outer shroud ring pattern 32 at locations opposite from the clamps 180 and 182.

The annular flange 183 on the first pattern section 50 of the outer shroud ring pattern 32 (FIGS. 1 and 7) is formed by continuous annular layers 134 (FIG. 4) of the ultraviolet light curable polymer resin 112 (FIG. 6). As was previously mentioned, the outer shroud ring pattern 32, including the flange 183, may be formed of a different material if desired. The continuous annular upper (as viewed in FIG. 4) layer 134 of the flange 183 provides a smooth continuous surface for engagement by the clamps 180, 182, 184 and 186.

Clamps 190 and 192 on the inner retaining members 152 and 54 (FIG. 7) engage a circular flange 193 on the inner shroud ring pattern 30. The annular flange 193 (FIGS. 1 and 7) on the first pattern section 44 of the inner shroud ring pattern 30 is formed by continuous annular layers of the ultraviolet light curable polymer resin 112 (FIG. 6). The continuous annular layers forming the flange 193 on the inner shroud ring pattern 30 correspond to and are formed in the same way as the continuous annular layers 134 (FIG. 4) forming the flange 183 on the outer shroud ring pattern 132.

Assembly

When the fixture assembly 130 is to be utilized to facilitate assembly of components of the apparatus 10 (FIGS. 1 and 2), the clamps 180-186 are operated to their disengaged condition by pivoting handles 196 outwardly in a direction away from the central axis of the assembly fixture 130. The slide bars 140 are then released and the outer retaining members 136 and 138 are moved outwardly away from the center of the fixture assembly. In addition, the clamps 190 and 192 are operated to their disengaged condition by pivoting handles 200 inwardly toward the central axis of the assembly fixture 130. The inner retaining members 152 and 154 are then moved inwardly, toward the central axis of the assembly fixture 130.

Components of a previously assembled apparatus 10 are then removed from the assembly fixture 130. This results in the annular array 166 of airfoil positioning ramps 168 being circumscribed by and spaced radially inwardly from the outer retaining members 136 and 138. At this time, the inner retaining members 152 and 154 are circumscribed by and spaced inwardly from the annular array 166 of airfoil positioning ramps 168.

When another apparatus 10 is to be assembled utilizing the fixture 130, the second pattern section 46 of the inner shroud ring pattern 30 is positioned in engagement with the base 134 of the assembly fixture 130. The second pattern section 46 of the inner shroud ring pattern has an annular flange 210 (FIGS. 1 and 2). The flange 210 is positioned in engagement with the base 134 at a location radially inwardly of and coaxial with the annular array 166 of airfoil positioning ramps. This results in the annular flange 210 having an upright (as viewed in FIG. 7) central axis which is coincident with the central axis of the assembly fixture 130.

The flange 210 (FIGS. 1 and 2) on the second pattern section 46 of the inner shroud ring pattern 30 is formed, using the stereolithography apparatus 100 of FIG. 6, of continuous annular layers, corresponding to the layers 142 (FIG. 5) on the second pattern section 52 of the outer shroud ring pattern 32. Therefore, a flat annular side surface of the flange 210 on the second pattern section 46 is formed by a continuous annular outer layer which is placed in flat abutting engagement with flat upper side surface of the base 134. The flange 210 has an upper side surface which is parallel to the lower side surface of the flange. The upper side surface of the flange 210 is also formed by a continuous annular layer, corresponding to one of the layers 142 of FIG. 5.

The second pattern section 52 of the outer shroud ring pattern 32 is also positioned in the assembly fixture 130. The second pattern section 52 of the outer shroud ring pattern 32 is positioned radially outwardly of and in a coaxial relationship with the annular array 166 of airfoil positioning ramps. The second pattern section 52 of the outer shroud ring pattern 32 has an annular flange 214 (FIGS. 1 and 5) which is positioned in engagement with the upper surface of the base 134.

Figure 7:
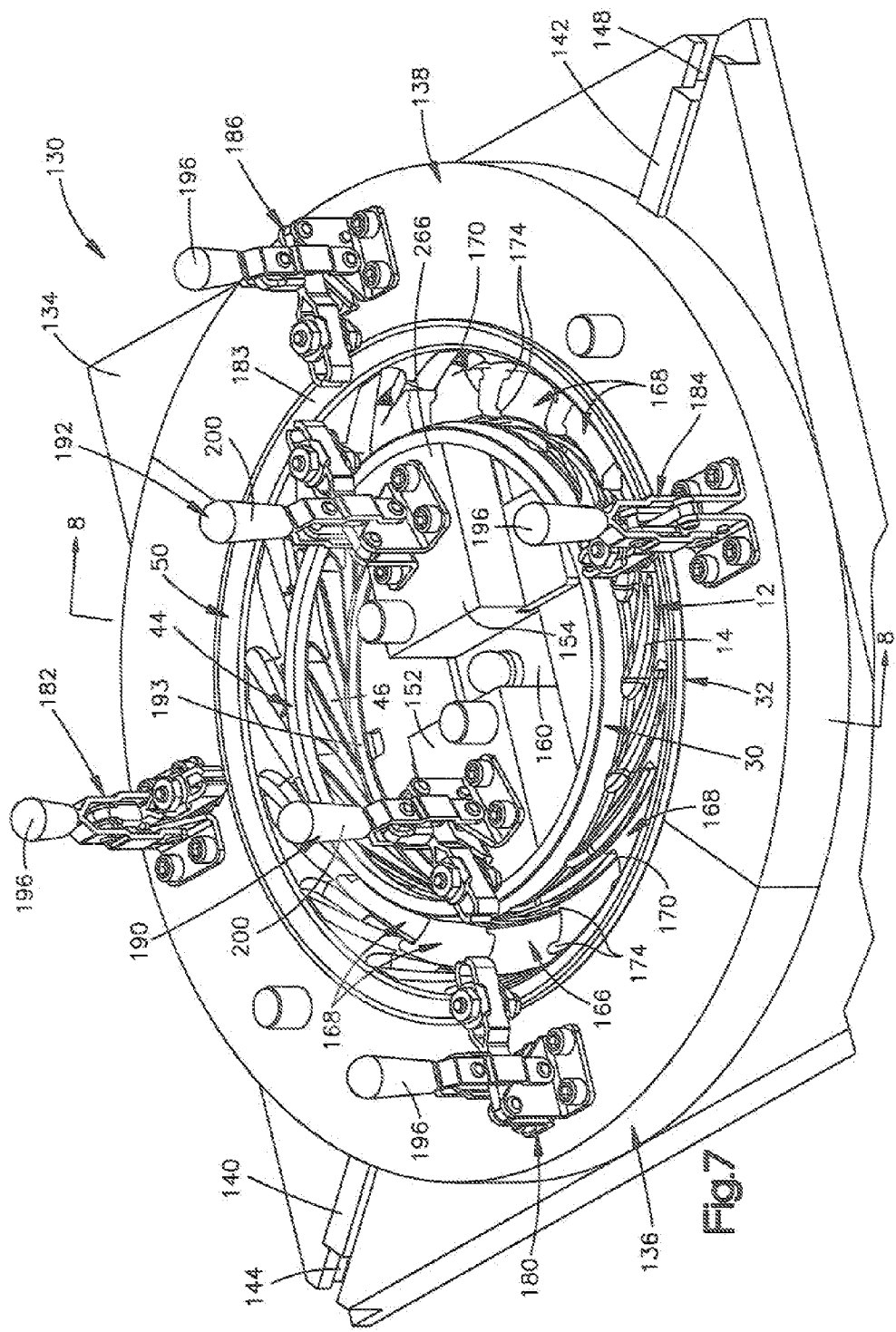
FIG. 7 is a schematic illustration of an assembly fixture which is utilized in assembling the inner and outer shroud ring patterns of FIGS. 1-5 and the annular array of airfoils in a coaxial relationship.

The annular flange 214 is formed by continuous annular layers 142 (FIG. 5) of photopolymer resin which has been cured by a light beam 110 (FIG. 6) from the laser 106. Therefore, a flat annular bottom side surface of the flange 214 on the second pattern section 52 is formed by a continuous annular layer 142 which is placed in flat abutting engagement with the upper side surface of the base 134 (FIG. 7). An upper side surface of the flange 214 on the second pattern section 52 is also formed by a continuous annular layer 142.

The projections 70 on the second pattern section 52 of the outer shroud ring pattern 32 extend upwardly and are exposed. Similarly, the projections on the second pattern section 46 of the inner shroud ring pattern 30 extend upwardly and are exposed. The projections on the second pattern section 46 and the inner shroud ring 30 have the same configuration and are radially aligned with the projections 70 on the second pattern section 52 of the outer shroud ring pattern 32. Although only the projections 70 for the second pattern section 52 of the outer shroud ring pattern 32 have been illustrated in FIG. 5 it should be understood that the projections on the second pattern section 46 of the inner shroud ring pattern 30 are constructed in the same manner and have the same configuration as the illustrated projections 70 on the second pattern section 52 of the outer shroud ring pattern 32.

The outer retaining members 136 and 138 are moved radially inward to engage the second pattern section 52 of the outer shroud ring pattern 32. Similarly, the inner retaining members 152 and 154 are moved radially outward to engage the second pattern section 46 of the inner shroud ring pattern 30. This results in the second pattern section 46 of the inner shroud ring pattern 30 and a second pattern section 52 of the outer shroud ring pattern 32 being positioned in a coaxial relationship relative to each other on the base 134 of the assembly fixture 130.

The airfoils 14, that is, vanes, are then positioned in an annular array on the airfoil positioning ramps 168. The radially inner end portions 36 of the metal vanes 14 are positioned in recesses or pockets 54 (FIGS. 8 and 9) which are partially formed in the second section 46 of the inner shroud ring pattern 30. The radially outer end portions 38 of the airfoils 14 are positioned adjacent to the projections 70 on the second pattern section 52 of the outer shroud ring pattern 32. In the illustrated embodiment of the invention, the radially outer end portions 38 (FIG. 2) of the airfoils extend through the openings 87 (FIG. 3) in the outer shroud ring pattern 32. The outer end portions 38 of the airfoils 14 extend radially outward from the second pattern section 52 of the outer shroud ring pattern 32.

The airfoils 14 are positioned radially relative to the second pattern section 46 of the inner shroud ring pattern 30 and the second pattern section 52 of the outer shroud ring pattern 32 (FIGS. 1 and 2) by engagement of the radially outer end portions 38 of the airfoils with locating surface areas on the second pattern section 52. The locating surface areas on the second pattern section 52 of the outer shroud ring pattern 32 are disposed adjacent to the trailing edge portions 22 of the airfoils 14. In the illustrated embodiment of the invention, the locating surfaces are formed on radially inward facing side surface areas adjacent to the openings 87 (FIG. 3).

If desired, the surfaces for locating the airfoils 14 radially relative to the second pattern sections 46 and 52, may be disposed at locations other than on side surface areas adjacent the openings 87 in the second pattern section 52 of the outer shroud ring pattern 32. For example, the radially outer end portions 48 of the airfoils 14 may engage surfaces formed in recesses or pockets in the second pattern section 52 of the outer shroud ring pattern 32. These recesses or pockets in the second pattern section 52 of the outer shroud ring pattern 32 may have a construction similar to the construction of the recesses or pockets 54 (FIGS. 8 and 9) in the second pattern section 46 of the inner shroud ring pattern 30. If desired, shoulders on the airfoils 14 may also engage radially inwardly facing locating surfaces formed on the first pattern section 50 of the outer shroud ring pattern 32. Alternatively, the radially outer end portions 38 of the airfoils 14 may engage radial locating surface areas formed on the outer retaining members 136 and 138 (FIG. 7).

Rather than engaging locating surfaces on the second pattern section 52 of the outer shroud ring pattern 32 and/or outer retaining members 136 and 138, the locating surfaces may be disposed on the second pattern section 46 of the inner shroud ring pattern 30 and/or inner retaining members 152 and 154. If this is done, the airfoils 14 may engage locating surfaces in and/or adjacent to the pockets 54 (FIGS. 8 and 9) in the second pattern section 46. Alternatively, the airfoils may engage locating surfaces disposed radially inward from the second pattern section 46.

The airfoils 14 are located transversely relative to the second pattern sections 46 and 52 of the inner and outer shroud ring patterns 30 and 32 by engagement with locating surfaces formed on the positioning ramps 168. The trailing edge portions 22 of the airfoils 14 engage the locating surfaces 174 on the ramps 168. When an airfoil 14 is positioned on one of the ramps 168, the trailing edge portion of the airfoil engages a locating surface which extends from the immediately preceding ramp 168 in the annular array 166 of ramps. In addition, the convex side surfaces 18 (FIG. 2) on the airfoils 14 engage locating surface areas on the ramps 168. Of course, the airfoils 14 may be positioned relative to the ramps 168 by engagement with locating surfaces disposed at other locations on the ramps.

If desired, the array 166 of ramps 168 may be omitted and the airfoils 14 positioned by engagement with locating surfaces formed on the second pattern sections 46 and 52 of the inner and outer shroud ring patterns 30 and 32. The locating surfaces may be formed on the second pattern sections 46 and 52 during use of the stereolithography apparatus 100 to form the second pattern sections. Alternatively, the locating surfaces may be formed on the second pattern sections 46 and 52 during a machining operation which is performed after the second pattern sections have been removed from the stereolithography apparatus 100.

It is contemplated that it may be desired to use airfoil locating surfaces which are formed separately from the inner and outer shroud ring patterns 30 and 32. For example, the radially outer end portions 38 of the airfoils 14 may engage locating surfaces on or connected with the outer retaining members 136 and 138 in the assembly fixture 130. If desired, the radially inner end portions 36 of the airfoils 14 may engage locating surfaces on or connected with the inner retaining members 152 and 154 in the assembly fixture 130. This would result in the radially inner and outer and portions 36 and 38 of the airfoils 14 being spaced from the second pattern sections 46 and 52. It is contemplated that airfoil locating surfaces may be provided in the assembly fixture 130 with the airfoil locating surfaces separate from the outer retaining members 136 and 138 and/or from the inner retaining members 152 and 154.

Once the second pattern sections 46 and 52 of the inner shroud ring patterns 30 and 32 and the annular array 12 of airfoils 14 has been positioned on the assembly fixture 130, the first pattern sections 44 and 50 of the inner and outer shroud ring patterns 30 and 32 are positioned on the assembly fixture 130. Of course, if the inner and outer shroud ring patterns 30 and 32 are formed with more than two pattern sections, sections which are disposed intermediate the first and second pattern sections of the inner and outer shroud ring patterns 30 and 32 may be positioned on the assembly fixture 130 before the first pattern sections 44 and 50 of the inner and outer shroud ring patterns are positioned on the assembly fixture.

When the first pattern section 50 (FIG. 1) of the outer shroud ring pattern 32 is to be connected with the second pattern section 52 of the outer shroud ring pattern, the first pattern section 50 is moved into coaxial alignment with the second pattern section 52 which is disposed on and held against movement by the assembly fixture 130. At this time, the projections 62 (FIG. 4) on the first pattern section 50 are offset from the projections 70 (FIG. 5) on the second pattern section 52 of the outer shroud ring pattern 32. The projections 62 on the first pattern section 50 are disposed in a spatial relationship with the projections 70 on the second pattern section 52 which is approximately the same as the relationship between the two pattern sections in FIGS. 4 and 5.

The first pattern section 50 is then moved downward (as viewed in FIGS. 4 and 5) toward the projections 70 on the second pattern section 52. The second pattern section 52 is held stationary by the assembly fixture 130 (FIG. 7) while the first pattern is moved downward. As this occurs, the lower end portions of the cam surfaces 76 on the projections 62 engage the upper end portions of the cam surfaces 84 on the projections 70.

As the first pattern section 50 continues to move downward toward the second pattern section 52, the first pattern section 50 is rotated about the central axis of the fixture assembly 130 in the direction of the arrow 86 (FIG. 4). The cam surfaces 76 (FIG. 4) slide along the cam surfaces 84 (FIG. 5) on the second pattern section 52. This sliding movement between the cam surfaces 76 and 84 promotes rotation of the first pattern section 50 in the direction of the arrow 86 (FIG. 4) relative to the second pattern section in 52.

As this occurs, the projections 62 on the first pattern section 50 move into position beneath (as viewed in FIG. 3) the leading edge portions 20 (FIG. 1) of the airfoils 14 in the array of airfoils. As this occurs, the projections 62 on the first pattern section 50 of the outer shroud ring pattern 32 move into the positions illustrated in FIG. 3 relative to the projections 70 on the second pattern section 52. At this time, the outer end portions 38 of the airfoils 14 are disposed between the first and second pattern sections 50 and 52.

When the coaxial first and second pattern sections 50 and 52 are in the positions illustrated in FIG. 3, the clamps 180, 182, 184 and 186 (FIG. 7) are operated from an open condition to a closed condition by pivoting the handles 196 inwardly toward the central axis of the assembly fixture 130. The clamps 180-186 press the flange 183 (FIG. 1) on the upper or first pattern section 50 downwardly toward the second or lower pattern section 52. This force is transmitted from the projections 62 (FIGS. 3 and 4) on the first pattern section 50 to the projections 70 on the second pattern section 52. The force transmitted from the clamps 180-186 through the projections 62 and 70 is effective to firmly press the annular flange 214 (FIG. 5) on the second pattern section 52 against the flat upper side surface of the base 134 of the assembly fixture 130.

If desired, there may be minimal (small) spaces or gaps between the airfoils 14 and the first and second pattern sections 50 and 52. Thus, there may be small gaps (spaces) between the concave side surfaces 16 (FIG. 3) on the airfoils 14 and the projections 70 on the second pattern section 52. Similarly, there may be small gaps (spaces) between the concave and convex side surfaces 16 and 18 on the airfoils 14 and the projections 70 on the second pattern section 52. In addition, there may be small gaps (spaces) between the concave and convex surfaces 16 and 18 on the airfoils 14 and the surfaces on the projections 62 (FIG. 3) on the first pattern section 50. By having these small gaps (spaces) between the airfoils 14 and surfaces on the first and second pattern sections 50 and 52, the pattern sections can be formed with relatively large dimensional tolerances. The airfoils 14 are positioned relative to the first and second pattern sections 50 and 52 by engagement with the positioning ramps 168 in the array 166 of positioning ramps (FIG. 7), and/or by other positioning surfaces formed separately from the inner and outer shroud ring pattern sections 50 and 52. Of course, the gaps (spaces) may be omitted if desired.

The first and second pattern sections 44 and 46 of the inner shroud ring pattern 30 are interconnected in the same manner as previously described in connection with the first and second pattern sections 50 and 52 of the outer shroud ring pattern 32. After the second pattern section 46 of the inner shroud ring pattern 30 has been positioned in the assembly fixture 130 and the annular array 12 of airfoils 14 have been positioned relative to the second pattern sections 46 and 52 of the inner and outer shroud ring patterns 30 and 32, the first pattern section 44 of the inner shroud ring pattern 30 is connected with the second pattern section 46 of the inner shroud ring pattern. The first and second pattern sections 44 and 46 of the inner shroud ring pattern 30 have the same configuration as the first and second pattern sections 50 and 52 of the outer shroud ring pattern. Therefore, the second pattern section 46 of the inner shroud ring pattern 30 is connected with the first pattern section 44 of the inner shroud ring pattern in the same manner as previously described in connection with the first and second pattern sections 50 and 52 of the outer shroud ring pattern 32.

The first and second pattern sections 44 and 46 of the inner shroud ring pattern 30 may be interconnected either before or after the first and second pattern sections 50 and 52 of the outer shroud ring pattern 32 have been interconnected. If the first and second sections 50 and 52 of the outer shroud ring pattern are interconnected first, it may be desired to loosen the clamps 180-186 before the first and second sections 44 and 46 of the inner shroud ring pattern are interconnected.

When the first and second pattern sections 44 and 46 of the inner shroud ring pattern 30 are to be interconnected, the first pattern section 44 is moved into a coaxial relationship with the second pattern section 46 which is mounted on the assembly fixture 130. The first pattern section 44 is then moved axially downward (as viewed in FIG. 7) toward the stationary second pattern section 46. As the first pattern section 44 is moved downward toward the second pattern section 46, cam surfaces on projections from the first pattern section 44 engage cam surfaces on projections from the second pattern section 46.

The projections on the first pattern section 44 of the inner shroud ring pattern 30 have the same configuration as the projections 62 from the first pattern section 50 (FIG. 4) of the outer shroud ring pattern 32. Similarly, the projections on the second pattern section 46 of the inner shroud ring pattern 30 have the same configuration as the projections 70 on the second pattern section 52 (FIG. 5) of the outer shroud ring pattern 32. As the first pattern section 44 of the inner shroud ring pattern 30 is moved downward toward the second pattern section 46, the first pattern section 44 is manually rotated. This rotation is promoted by the interaction between the cam surfaces on the first pattern section 44 and the second pattern section 46 in the manner previously explained in conjunction with the pattern sections 50 and 52 of the outer shroud ring pattern 32.

When the coaxial first and second pattern sections 44 and 46 are in engagement, the clamps 190 and 192 are operated from an open condition to a closed condition by pivoting the handles 200 outwardly away from the central axis of the assembly fixture 130. The clamps 190 and 192 press against the annular flange 193 on the upper or first pattern section 44. The upper or first pattern section 144 is pressed downward toward the second or lower pattern section 46. This force is transmitted from the projections on the first pattern section 44 to the second pattern section 46. The force transmitted from the clamps 190 and 192 through the projections on the pattern sections 44 and 46 is effective to firmly press the flange 210 on the second pattern section 46 against the flat upper side surface of the base 134 of the assembly fixture 130.

In the foregoing description, the first pattern section 50 of the outer shroud ring pattern 32 was connected with the second pattern section 52 of the outer shroud ring pattern before the first pattern section 44 of the inner shroud ring pattern 30 was connected with the second pattern section 46 of the inner shroud ring pattern. It is contemplated that the sections 44 and 46 of the inner shroud ring pattern 30 may be interconnected before the pattern sections 50 and 52 of the outer shroud ring pattern 32 are interconnected. It is also contemplated that the clamps 180-186, 190 and 192 may be operated to their closed conditions after pattern sections 44, 46, 50 and 52 of ring patterns 30 and 32 have been interconnected.

If desired, there may be minimal (small) spaces or gaps between the airfoils and the first and second pattern sections 44 and 46. Thus, there may be small gaps (spaces) between the concave and convex surfaces 16 and 18 on the airfoils 14 and the surfaces on the projections on the second pattern section 46. Similarly, there may be small gaps (spaces) between the concave and convex surfaces 16 and 18 on the airfoils 14 and the surfaces on the projections on the first pattern section 44. By having these small gaps (spaces) between the airfoils 14 and the surfaces on the first and second pattern sections 44 and 46, the pattern sections can be formed with relatively large tolerances. The airfoils 14 are positioned relative to the first and second pattern sections 44 and 46 by engagement with the positioning ramps 168, and/or by other positioning surfaces formed separately from the inner shroud ring pattern sections 44 and 46. Of course, the gaps (spaces) may be omitted if desired.

Once the first and second pattern sections 44 and 46 of the inner shroud ring pattern 30 and the first and second sections 50 and 52 of the outer shroud ring pattern 32 have been interconnected in the manner previously explained, the airfoils 14 are secured against movement relative to the inner and outer shroud ring patterns 30 and 32. This is accomplished by utilizing small bodies of adhesive or other connecting material to connect the airfoils 14 with the inner and outer shroud ring patterns 30 and 32. In addition, small bodies of adhesive or other connecting material are applied at the joints between the first and second pattern sections 44 and 46 of the inner shroud ring pattern 32 to interconnect the pattern sections. Similarly, small bodies of adhesive are or other connecting material applied at the joints between the first and second pattern sections 50 and 52 of the outer shroud ring pattern 32 to interconnect the first and second pattern sections. If desired, mechanical fasteners may be utilized to interconnect the shroud ring pattern sections. Mechanical fasteners may be utilized to interconnect the airfoils 14 and the shroud ring patterns 30 and 32.

Figure 8:
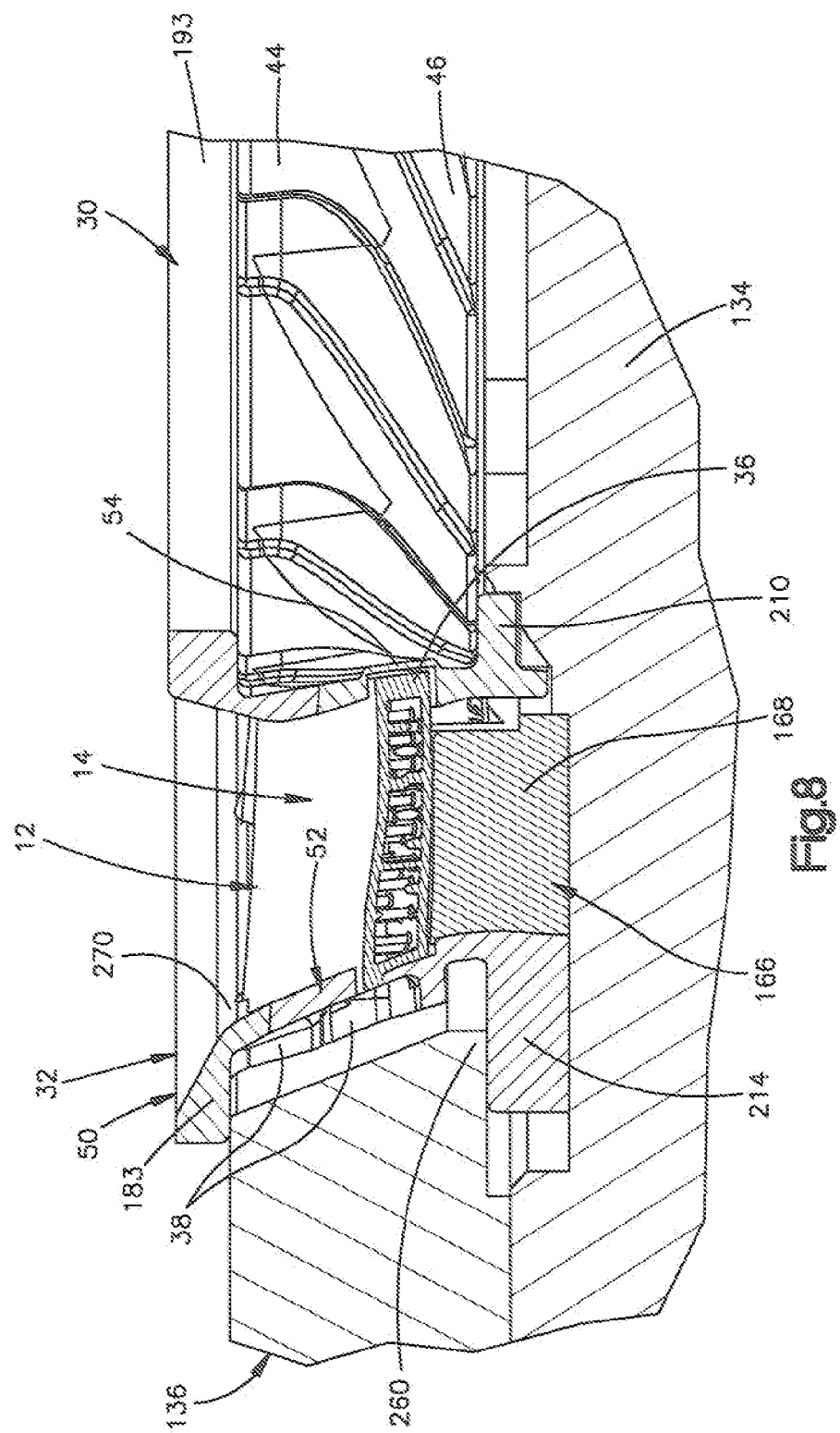
FIG. 8 is an enlarged fragmentary schematic sectional view, taken generally along a portion of the line 8-8 of FIG. 7, further illustrating the relationship of airfoils to the inner and outer shroud ring patterns.
Figure 9:
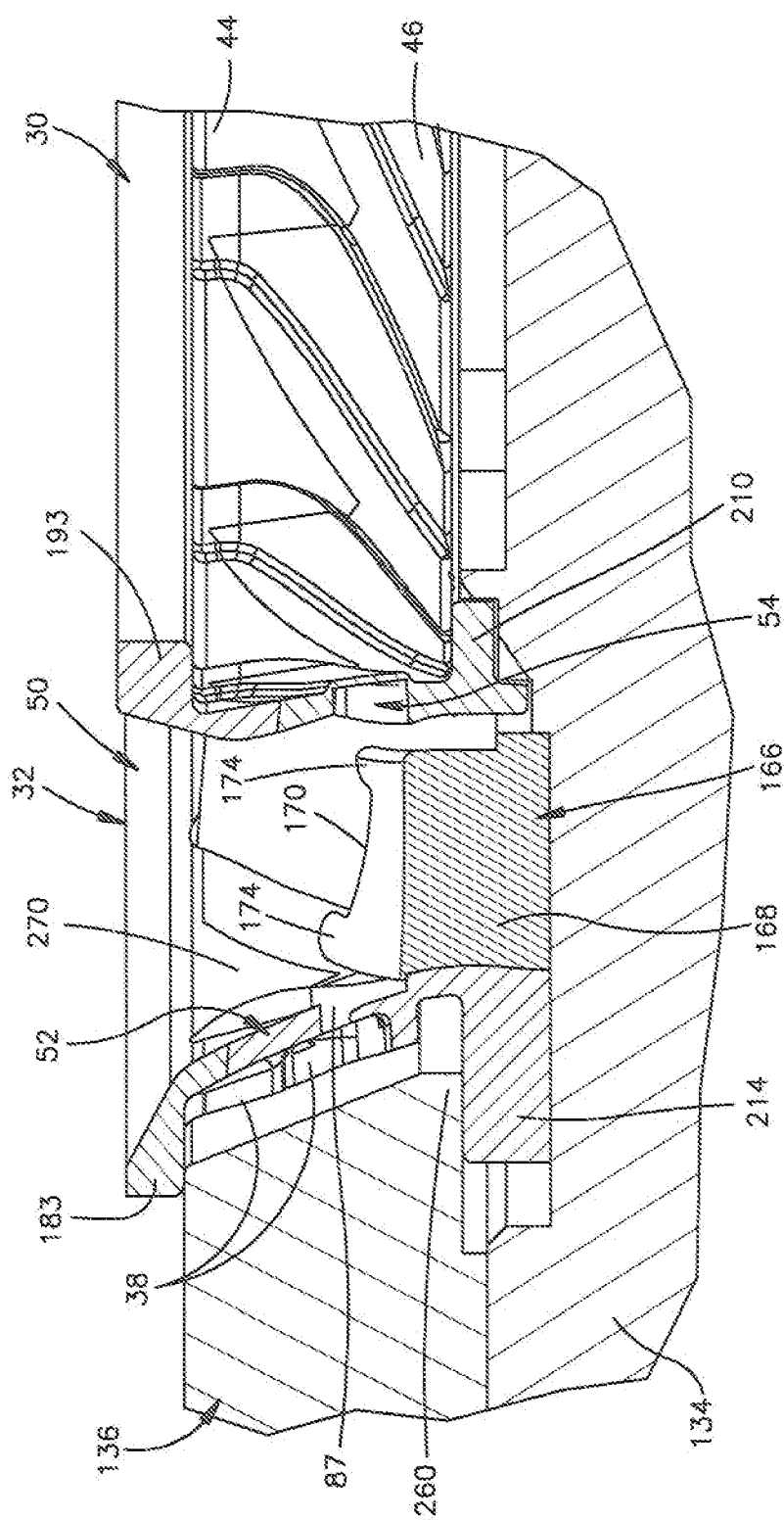
FIG. 9 is an enlarged fragmentary schematic sectional view, generally similar to FIG. 8, illustrating the construction of a recess formed in the inner shroud ring pattern to receive a portion of an airfoil.

The manner in which the annular array 12 of airfoils 14 cooperates with the inner and outer shroud ring patterns 30 and 32 and the manner in which the shroud ring patterns are held against movement relative to the assembly fixture 130 are illustrated in FIGS. 8, 9 and 10. The manner in which the outer retainer member 136 cooperates with the base 134 to grip the outer shroud ring pattern 32 is illustrated schematically in FIGS. 8-9. A nose portion 260 of the outer retainer member 136 overlies the flange 214 on the second pattern section 52 (FIG. 1) of the outer shroud ring pattern 32. Similarly a nose portion 262 (FIG. 10) of the outer retainer member 138 overlies the flange 214 on the second pattern section 52 of the outer shroud ring pattern 32.

The outer retaining members 136 and 138 and base 134 grip the outer shroud ring pattern 32 and hold it against movement relative to the base. In the embodiment of the invention illustrated in FIGS. 8-9, the only place where the outer retaining members 136 and 138 engage the outer shroud ring pattern 32 is where the nose portions 260 and 262 of the outer retaining members 136 and 138 overlies the annular flange 214 on the outer shroud ring pattern 32. However, the outer retaining members 136 and/or 138 could engage the outer shroud ring pattern 32 at other locations.

Similarly, the inner retaining members 152 and 154 cooperate with the base 134 to hold the inner shroud ring pattern 30 against movement relative to the base 134. The inner retaining members 152 and 154 have a nose portions which overlie the flange 210 on the inner shroud ring pattern 30. The flange 210 is gripped between the base 134 and the nose portions of the inner retaining members 152 and 154 to hold the inner shroud ring pattern 30 against movement relative to the base 134. In the embodiment of the invention illustrated in FIG. 10, the only place where the inner retaining members 152 and 154 engage the inner shroud ring pattern 30 is where the nose portions of the inner retaining members 152 and 154 engage the upper side surface of the flange 210. However, the inner retaining members 152 and/or 154 could engage the inner shroud ring pattern 30 at other locations.

The outer shroud ring pattern 32 is provided with openings 87 (FIG. 3) through which radially outer end portions 38 of the airfoils 14 extend. Shoulders on the airfoils 14 engage an annular inner side surface 270 (FIGS. 8 and 9) on the outer shroud ring pattern 32 to position to the airfoils 14 radially relative to the outer shroud ring pattern 32. In the embodiment of the invention illustrated in FIGS. 8-10, the radially outer end portions 38 of the airfoils 14 are spaced from the outer retaining members 136 and 138 (FIG. 7). However, if desired, the radially outer end portions 38 of the airfoils 14 may engage the outer retaining members 136 and 138 to position the airfoils in a radial direction relative to the outer shroud ring pattern 32.

The inner shroud ring pattern 30 is provided with recesses or pockets 54 in which radially inner end portions 36 of the airfoils 14 are received (FIG. 8). The recesses or pockets 54 engage the radially inner end portions 36 of the airfoils 14 to position the airfoils relative to the inner shroud ring pattern. The radially inner end portions 36 of the airfoils 14 are located in the recesses or pockets 54 and are at least partially disposed between the first and second shroud ring pattern sections 44 and 46.

Once the first and second pattern sections of the inner shroud ring pattern 30 and the outer shroud ring pattern 32 have been interconnected and once the airfoils 14 have been connected with the inner and outer shroud ring patterns 30 and 32, the clamps 180, 182, 184, 186, 190 and 192 are released. The apparatus 10 is then removed from the assembly fixture 130. Wax gating patterns (not shown) are connected with the inner and outer shroud ring patterns 30 and 32. The gating patterns have wax sections with configurations corresponding to the desired configuration of passages through which molten metal is to be moved into a mold formed with the inner and outer shroud ring patterns 30 and 32. The wax patterns having configurations corresponding to the configurations of the passages through which molten metal is to flow are connected with a wax pattern of a pour cup.

The entire pattern assembly is then covered with a suitable mold material. Thus, the inner and outer shroud ring patterns 30 and 32 and the annular array 12 of airfoils 14 are covered with a known ceramic mold material. In addition, the entire gating pattern is covered with the ceramic mold material. A pattern assembly which includes the gating pattern and the apparatus 10 of FIG. 1, is covered with ceramic mold material by dipping the pattern assembly in a slurry of liquid ceramic mold material.

Although many different types of slurries of ceramic mold material may be utilized, one illustrative slurry contains fused silica, zircon and other refractory materials in combination with binders. Chemical binders, such as ethalsilicate, sodium silicate and colloidal silica can be utilized. In addition, the slurry may contain suitable film formers, such as alginates, to control viscosity and wetting agents to control flow characteristics and added wetability.

In accordance with well-known practices, an initial slurry coating is applied to the entire pattern assembly, that is, to the apparatus 10 of FIG. 1 and the gating pattern. The initial slurry coating may contain a finely divided refractory material to produce an accurate surface finish. After the application of the initial coating, the surface is stuccoed with refractory materials. Although one known specific type of ceramic mold material has been described herein, other known types of mold material could be utilized if desired.

The ceramic mold material overlies and is in direct engagement with the concave and convex side surfaces 16 and 18 of the metal airfoils 14. In addition, the ceramic mold material overlies the axially outer end portions 38 (FIGS. 1 and 2) of the airfoils 14. The ceramic mold material encloses the inner and outer shroud ring patterns 30 and 32. Of course, all of the other components of the pattern assembly, including the gating system, are covered with the ceramic mold material.

After the ceramic mold material has at least partially dried, the mold material is heated to melt the wax material of the wax pattern of the gating system. In addition, the polymeric material of the inner and outer shroud ring patterns 30 and 32 is melted. The melted wax and the melted material of the inner and outer shroud ring patterns is poured out of the resulting mold through an open end portion of the pour cup. The mold is then fired for a time sufficient to cure the mold material.

The apparatus 10 (FIGS. 1 and 2) and the wax pattern for the gating system may be encased in mold material in the same manner as is described in U.S. Pat. No. 4,728,258. The wax pattern for the gating system and the inner and outer shroud ring patterns 30 and 32 are removed from the mold in the manner disclosed in the aforementioned U.S. Pat. No. 4,728,258. The disclosure in the aforementioned U.S. Pat. No. 4,728,258 is hereby incorporated herein in its entirety by this reference thereto. If desired, the wax pattern for the gating system and the apparatus 10 may be encased in mold material in a different manner.

Once a mold has been formed in the manner previously described, molten metal is poured into the mold through the pour cup of the mold. The molten metal flows through gating passages to the upper and lower end portions of shroud ring mold cavities formed by the inner and outer shroud ring patterns 30 and 32. Once the molten metal has been poured, it solidifies in the mold cavities and interconnects the airfoils 14 in a known manner, similar to that described in the aforementioned U.S. Pat. No. 4,728,258.

The molten metal solidifies to form inner and outer shroud rings having configurations corresponding to the configurations of the inner and outer shroud ring patterns 30 and 32. The metal shroud rings may have a composition which is of a different composition than the composition of the metal airfoils 14. Thus, the airfoils may be formed of a nickel-chrome super alloy. The inner and outer shroud rings may be formed of a cobalt chrome super alloy. If desired, the inner and outer shroud rings may be formed of different metal. If desired, the inner and outer shroud rings may be formed of the same metal as the airfoils. Alternatively, the inner and outer shroud rings and/or the airfoils may be formed of materials which are not metal.

The outer end portions 38 of the airfoils 14 will extend outwardly of the metal outer shroud ring. Thus, the airfoils 14 will extend outward from the metal outer shroud ring to the same extent as in which the airfoils extend outward from the outer shroud ring pattern 32 in FIGS. 8 and 9. This facilitates establishing a flow of cooling fluid through the hollow airfoils 14.

Embodiment of FIG. 11

In the embodiment of the invention illustrated in FIG. 9, the inner shroud ring pattern 30 is provided with recesses or pockets 54 in which radially inner end portions 36 of the airfoils 14 are received. In the embodiment of the invention illustrated in FIG. 11, the inner shroud ring pattern 30 is provided with openings through which radially inner end portions of the airfoils extend. Since the embodiment of the invention illustrated in FIG. 11 is generally similar to the embodiment of the invention illustrated in FIGS. 1-10, similar numerals will be utilized to indicate similar components, the suffix letter "a" being added to the numerals of FIG. 11 to avoid confusion.

Inner and outer shroud ring patterns 30a and 32a are illustrated in FIG. 11 in an assembly fixture 130a. Although only a portion of the assembly fixture 130a is illustrated in FIG. 11, it should be understood that the assembly fixture 130a has the same construction and is utilized in the same manner as the assembly fixture 130 of FIG. 7.

An annular array of airfoils is disposed between the inner and outer shroud ring patterns 30a and 32a. The airfoils are disposed in engagement with positioning ramps 168a in an annular array 166a of airfoil positioning ramps. The inner and outer shroud ring patterns 30a and 32a and the annular array of airfoils are disposed in a coaxial relationship with each other and with the assembly fixture 130a.

The airfoils have radially outer end portions which extend through openings formed in the outer shroud ring pattern 32a. In addition, the airfoils have radially inner end portions which are disposed adjacent to the inner shroud ring pattern 30a.

In accordance with a feature of the embodiment of the invention illustrated in FIG. 11, the inner shroud ring pattern 30a is provided with radially extending openings 280 which extend through the inner shroud ring pattern 30a. The openings 280 are formed between projections from first and second pattern sections 44a and 46a of the inner shroud ring pattern 30a in much the same manner in which the openings 87 (FIG. 3) are formed between the projections 62 and 70 of the first and second pattern sections 50 and 52 of the outer shroud ring pattern 32 (FIG. 3). The radially inner end portions of the airfoils engage the radially inner side surface 284 of the inner shroud ring pattern 30a to limit radially inward movement of the airfoils 14a relative to the inner shroud ring pattern 30a.

CONCLUSION

In view of the foregoing description, it is apparent that the present invention provides a new and improved method of forming a turbine engine component having a plurality of airfoils disposed in an annular array between inner and outer shroud rings. If desired, an inner shroud ring pattern 30 may be formed by sequentially forming cross sectional layers of the inner shroud ring pattern and interconnecting the cross sectional layers of the inner shroud ring pattern. Similarly, it may be desired to have an outer shroud ring pattern 32 formed by sequentially forming cross sectional layers of the outer shroud ring pattern and interconnecting the cross sectional layers of the outer shroud ring pattern.

After a plurality of airfoils 14 have been positioned in an annular array 12 which extends between the shroud ring patterns 30 and 32, the shroud ring patterns are covered with a ceramic mold material. The inner and outer shroud ring patterns 30 and 32 are then removed from the covering of ceramic mold material to leave inner and outer shroud ring mold cavities having configurations corresponding to the configurations of inner and outer shroud ring patterns. The mold cavities are filled with molten metal which is solidified to form inner and outer shroud rings.

If desired, the inner and/or outer shroud ring patterns 30 and 32 may be formed of a plurality of sections. The sections 44 and 46 of the inner shroud ring pattern 30 may be interconnected with portions 36 of the airfoils 14 in the array 12 of airfoils disposed between the shroud ring pattern sections. Similarly, the sections 50 and 52 of the outer shroud ring pattern may be interconnected with portions 38 of the airfoils 14 in the array 12 of airfoils disposed between the shroud ring pattern sections. It may be desired to interconnect the sections 44 and 46 of the inner shroud ring pattern 30 by providing relative rotation between the sections of the inner shroud ring pattern. Similarly, it may be desired to interconnect the sections 50 and 52 of the outer shroud ring pattern by providing relative rotation between the sections of the outer shroud ring pattern.

The present invention includes many different features which may be utilized together in the manner described herein. However, it is also contemplated that the various features of the invention may be utilized separately, or in different combinations with each other, and/or in combination with features from the prior art.

Having described the invention, the following is claimed:

1. A method of forming a turbine engine component having a plurality of airfoils disposed in an annular array between inner and outer shroud rings, said method comprising the steps of forming an inner shroud ring pattern by sequentially forming cross sectional layers of the inner shroud ring pattern and interconnecting the cross sectional layers of the inner shroud ring pattern, forming an outer shroud ring pattern by sequentially forming cross sectional layers of the outer shroud ring pattern and interconnecting the cross sectional layers of the outer shroud ring pattern, positioning at least an annular portion of the inner shroud ring pattern and at least an annular portion of the outer shroud ring pattern in a coaxial relationship, thereafter, positioning a plurality of airfoils in an annular array with radially inner end portions of the airfoils adjacent the inner shroud ring pattern and radially outer end portions of the airfoils adjacent the outer shroud ring pattern, covering the inner and outer shroud ring patterns with ceramic mold material, removing the inner and outer shroud ring patterns from the covering of ceramic mold material to leave inner and outer shroud ring mold cavities having configurations corresponding to the configurations of the inner and outer shroud ring patterns, filling the inner and outer shroud ring mold cavities with molten metal, and solidifying the molten metal in the inner and outer shroud ring mold cavities to form inner and outer shroud rings which are connected to the radially inner and outer end portions of the airfoils.

2. A method as set forth in claim 1 wherein said step of forming an inner shroud ring pattern includes forming first and second annular inner shroud ring pattern sections, said step of positioning a plurality of airfoils in an annular array includes positioning the radially inner end portions of the airfoils adjacent to the first annular inner shroud ring pattern section and positioning the second annular inner shroud ring pattern section adjacent to the radially inner end portions of the airfoils, said step of interconnecting the cross sectional layers of the inner shroud ring pattern includes interconnecting the first and second annular inner shroud ring pattern sections with the radially inner end portions of the airfoils at least partially disposed between portions of the first and second annular inner shroud ring pattern sections, said step of forming an outer shroud ring pattern includes forming first and second annular outer shroud ring pattern sections, said step of positioning a plurality of airfoils in an annular array includes positioning the radially outer end portions of the airfoils adjacent to the first annular outer shroud ring pattern section and positioning the second annular outer shroud ring pattern section adjacent to the radially outer end portions of the airfoils, said step of interconnecting the cross sectional layers of the outer shroud ring pattern includes interconnecting the first and second annular outer shroud ring pattern sections with the radially outer end portions of the airfoils at least partially disposed between portions of the first and second annular outer shroud ring pattern sections.

3. A method as set forth in claim 1 wherein said step of sequentially forming cross sectional layers of the inner shroud ring pattern includes forming a first annular layer of the inner shroud ring pattern, forming a second annular layer of the inner shroud ring pattern adjacent to the first annular layer of the inner shroud ring pattern, adhering the second annular layer of the inner shroud ring pattern to first annular layer of the inner shroud ring pattern, forming a first discontinuous layer of the inner shroud ring pattern, forming a second discontinuous layer of the inner shroud ring pattern adjacent to the first discontinuous layer of the inner shroud ring pattern, adhering the second discontinuous layer of the inner shroud ring pattern to the first discontinuous layer of the inner shroud ring pattern, said step of interconnecting cross sectional the layers of the inner shroud ring pattern includes forming at least a portion of the inner shroud ring pattern with a unitary construction, said step of sequentially forming cross sectional layers of the outer shroud ring pattern includes forming a first annular layer of the outer shroud ring pattern, forming a second annular layer of the outer shroud ring pattern adjacent to the first annular layer of the outer shroud ring pattern, adhering the second annular layer of the outer shroud ring pattern to the first annular layer of the outer shroud ring pattern, forming a first discontinuous layer of the outer shroud ring pattern, and forming a second discontinuous layer of the outer shroud ring pattern adjacent to the first discontinuous layer of the outer shroud ring pattern said step of interconnecting the cross sectional layers of the outer shroud ring pattern includes forming at least a portion of the outer shroud ring pattern with a unitary construction.

4. A method as set forth in claim 1 wherein said step of forming an inner shroud ring pattern includes forming first and second annular inner shroud ring pattern sections, said step of forming an outer shroud ring pattern includes forming first and second annular outer shroud ring pattern sections, said step of positioning at least an annular portion of the inner shroud ring pattern and at least an annular portion of the outer shroud ring pattern in a coaxial relationship includes positioning the first annular inner shroud ring pattern section and the first annular outer shroud ring pattern section a coaxial relationship, said step of positioning a plurality of airfoils in an annular array includes positioning the plurality of airfoils in an annular array which is disposed in a coaxial relationship with said first annular inner shroud ring pattern section and in a coaxial relationship with said first annular outer shroud ring pattern section.

5. A method as set forth in claim 4 further including the steps of positioning the second annular inner shroud ring pattern section adjacent to the annular array of airfoils in a coaxial relationship with the first annular inner shroud ring pattern section, positioning the second annular outer shroud ring pattern section adjacent to the annular array of airfoils in a coaxial relationship with the first annular outer shroud ring pattern section, interconnecting the first and second annular inner shroud ring pattern sections, and interconnecting the first and second annular outer shroud ring pattern sections.

6. A method as set forth in claim 1 further including the step of providing an annular array of airfoil locating surface portions, said step of positioning a plurality of airfoils in an annular array includes positioning each one of the airfoils of the plurality of airfoils in engagement with at least one of the airfoil locating surface portions.

7. A method as set forth in claim 1 wherein said step of positioning a plurality of airfoils in an annular array includes positioning the airfoils with radially inner end portions of the airfoils spaced from the inner shroud ring pattern and radially outer end portions of the airfoils spaced from the outer shroud ring pattern, said method further includes connecting the radially inner end portions of the airfoils to the inner shroud ring pattern with bodies of connecting material which extend between radially inner end portions of the airfoils and the inner shroud ring pattern and connecting the radially outer end portions of the airfoils to the outer shroud ring pattern with bodies of connecting material which extend between the radially outer end portions of the airfoils and the outer shroud ring pattern.

8. A method as set forth in claim 1 further including the steps of providing an assembly fixture, said step of positioning at least an annular portion of the inner shroud ring pattern and at least an annular portion of the outer shroud ring pattern in a coaxial relationship includes positioning a first annular portion of the inner shroud ring pattern on the assembly fixture and, positioning a first annular portion of the outer shroud ring pattern on the assembly fixture, said step of positioning a plurality of airfoils in an annular array includes positioning the plurality of airfoils in an annular array on the assembly fixture with the annular array of airfoils in a coaxial relationship with the first annular portion of the inner shroud ring pattern and in a coaxial relationship with the first annular portion of the outer shroud ring pattern, thereafter, positioning a second annular portion of the inner shroud ring pattern on the assembly fixture, and positioning a second annular portion of the outer shroud ring pattern on the assembly fixture.

9. A method as set forth in claim 8 further including the steps of interconnecting radially inner end portions of the airfoils in the annular array of airfoils and the first and second annular portions of the inner shroud ring pattern by positioning bodies of connecting material in engagement with the radially inner end portions of the airfoils and the first and second annular portions of the inner shroud ring pattern, and interconnecting radially outer end portions of the airfoils in the annular array of airfoils and the first and second annular portions of the outer shroud ring pattern by positioning bodies of connecting material in engagement with the radially outer end portions of the airfoils and the first and second annular portions of the outer shroud ring pattern.

10. A method as set forth in claim 1 wherein said step of forming an inner shroud ring pattern includes providing a body of a liquid which is capable of solidification when exposed to a beam of radiation, positioning a support member immersed in the body of liquid in a position adjacent and immediately below an upper surface of the body of liquid, exposing the upper surface of the body of liquid to a beam of radiation, moving the beam of radiation relative to the upper surface of the body of liquid to effect formation of a first layer of solidified material on the support member, moving the support member and first layer of solidified material downward in the body of liquid, covering an upper surface of the first layer of solidified material with the liquid, exposing at least a portion of the upper surface of the liquid disposed over the first layer of solidified material to a beam of radiation, moving the beam of radiation relative to the body of liquid to effect formation of a second layer of solidified material on the first layer of solidified material, and adhering the second layer of solidified material to the first layer of solidified material, said step of forming the outer shroud ring pattern includes positioning the support member in the body of liquid in a first position adjacent and immediately below the upper surface of the body of liquid, exposing the upper surface of the body of liquid to a beam of radiation, moving the beam of radiation relative to the upper surface of the body of liquid to effect formation of a third layer of solidified material on the support member, moving the support member and third layer of solidified material downward in the body of liquid, covering an upper surface of the third layer of solidified material with the liquid, exposing at least a portion of the upper surface of the liquid disposed over the third layer of solidified material to a beam of radiation, moving the beam of radiation relative to the body of liquid to effect formation of a fourth layer of solidified material on the third layer of solidified material, and adhering the fourth layer of solidified material to the third layer of solidified material.

11. A method as set forth in claim 1 wherein said step of positioning the plurality of airfoils in an annular array includes engaging reference surface areas on at least one of the shroud ring patterns with locating surface areas on end portions of the airfoils.

12. A method as set forth in claim 1 wherein each of the airfoils of the plurality of airfoils is formed of metal, said step of forming an inner shroud ring pattern includes forming at least a portion of the inner shroud ring pattern of a polymeric material, said step of positioning a plurality of airfoils in an annular array includes positioning at least one of the metal airfoils relative to the inner shroud ring pattern by moving a locating surface on the one metal airfoil into engagement with a locating surface formed of polymeric material and disposed on the inner shroud ring pattern.

13. A method as set forth in claim 1 wherein each of the airfoils of the plurality of airfoils is formed of metal, said step of forming an outer shroud ring pattern includes forming at least a portion of the outer shroud ring pattern of a polymeric material, said step of positioning a plurality of airfoils in an annular array includes positioning at least one of the metal airfoils relative to the outer shroud ring pattern by moving a locating surface on the one metal airfoil into engagement with a locating surface formed of polymeric material and disposed on the outer shroud ring pattern.

14. A method as set forth in claim 1 wherein said step of forming an outer shroud ring pattern includes forming an outer shroud ring pattern having an annular flange, said method further includes gripping the annular flange on the outer shroud ring pattern while performing said step of positioning a plurality of airfoils in an annular array.

15. A method as set forth in claim 1 wherein said step of forming an inner shroud ring pattern includes forming an inner shroud ring pattern having an annular flange, said method further includes gripping the annular flange on the inner shroud ring pattern while performing said step of positioning a plurality of airfoils in an annular array.

16. A method of forming a turbine engine component having a plurality of airfoils disposed in an annular array between inner and outer shroud rings, said method comprising the steps of positioning a first annular section of an inner shroud ring pattern on an assembly fixture, positioning a first annular section of an outer shroud ring pattern on the assembly fixture, said first annular section of an inner shroud ring pattern and said first annular section of an outer shroud ring pattern being positioned on the assembly fixture in a coaxial relationship, positioning a plurality of airfoils in an annular array on the assembly fixture with the annular array of airfoils at least partially disposed between the first annular section of the inner shroud ring pattern and the first annular section of the outer shroud ring pattern, said step of positioning a plurality of airfoils in an annular array on the assembly fixture includes positioning the annular array of airfoils in a coaxial relationship with the first annular section of the inner shroud ring pattern and in a coaxial relationship with the first annular section of the outer shroud ring pattern, positioning a second annular section of the inner shroud ring pattern on the assembly fixture in a coaxial relationship with the first annular section of the inner shroud ring pattern, said step of positioning a second annular section of the inner shroud ring pattern on the assembly fixture includes providing relative rotation between the first and second annular sections of the inner shroud ring pattern, and positioning the second annular section of the outer shroud ring pattern on the assembly fixture in a coaxial relationship with the first annular section of the outer shroud ring pattern, said step of positioning a second annular section of the outer shroud ring pattern on the assembly fixture includes providing relative rotation between the first and second annular sections of the outer shroud ring pattern.

17. A method as set forth in claim 16 further including the steps of forming the first annular section of the inner shroud ring pattern by sequentially forming cross sectional layers of the first annular section of the inner shroud ring pattern and interconnecting the cross sectional layers of the first annular section of the inner shroud ring pattern, forming the second annular section of the inner shroud ring pattern by sequentially forming cross sectional layers of the second annular section of the inner shroud ring pattern and interconnecting the cross sectional layers of the second annular section of the inner shroud ring pattern, forming the first annular section of the outer shroud ring pattern by sequentially forming cross sectional layers of the first annular section of the outer shroud ring pattern and interconnecting the cross sectional layers of the first annular section of the outer shroud ring pattern, and forming the second annular section of the outer shroud ring pattern by sequentially forming cross sectional layers of the second annular section of the outer shroud ring pattern and interconnecting the cross sectional layers of the second annular section of the outer shroud ring pattern.

18. A method as set forth in claim 17 wherein said step of sequentially forming cross sectional layers of the first annular section of the inner shroud ring pattern includes forming a first annular layer of the first annular section of the inner shroud ring pattern, forming a second annular layer of the first annular section of the inner shroud ring pattern adjacent to the first annular layer of the first annular section of the inner shroud ring pattern, adhering the second annular layer of the first annular section of the inner shroud ring pattern to the first annular layer of the first annular section of the inner shroud ring pattern, forming a first discontinuous layer of the first annular section of the inner shroud ring pattern, forming a second discontinuous layer of the first annular section of the inner shroud ring pattern adjacent to the first discontinuous layer of the first annular section of the inner shroud ring pattern, and adhering the second discontinuous layer of the first annular section of the inner shroud ring pattern to the first discontinuous layer of the first annular section of the inner shroud ring pattern, said step of sequentially forming cross sectional layers of the second annular section of the inner shroud ring pattern includes forming a first annular layer of the second annular section of the inner shroud ring pattern, forming a second annular layer of the second annular section of the inner shroud ring pattern adjacent to the first annular layer of the second annular section of the inner shroud ring pattern, adhering the second annular layer of the second annular section of the inner shroud ring pattern to the first annular layer of the second annular section of the inner shroud ring pattern, forming a first discontinuous layer of the second annular section of the inner shroud ring pattern, forming a second discontinuous layer of the second annular section of the inner shroud ring pattern adjacent to the first discontinuous layer of the second annular section of the inner shroud ring pattern, adhering the second discontinuous layer of the second annular section of the inner shroud ring pattern to the first discontinuous layer of the second annular section of the inner shroud ring pattern.

19. A method as set forth in claim 18 said step of positioning the first annular section of an inner shroud ring pattern on the assembly fixture includes positioning the first annular section of the inner shroud ring pattern on the assembly fixture with the first and second discontinuous layers of the first annular section of the inner shroud ring pattern facing in a direction away from the assembly fixture, said step of positioning a second annular section of the inner shroud ring pattern on the assembly fixture includes positioning the second annular section of the inner shroud ring pattern on the assembly fixture with the first and second discontinuous layers of the second annular section of the inner shroud ring pattern facing in a direction toward the assembly fixture.

20. A method as set forth in claim 17 wherein said step of sequentially forming cross sectional layers of the second annular section of the outer shroud ring pattern includes forming a first annular layer of the second annular section of the outer shroud ring pattern, forming a second annular layer of the second annular section of the outer shroud ring pattern adjacent to the first annular layer of the second annular section of the outer shroud ring pattern, adhering the second annular layer of the second annular section of the outer shroud ring pattern to the first annular layer of the second annular section of the outer shroud ring pattern, forming a first discontinuous layer of the second annular section of the outer shroud ring pattern, forming a second discontinuous layer of the second annular section of the outer shroud ring pattern adjacent to the first discontinuous layer of the second annular section of the outer shroud ring pattern, adhering the second discontinuous layer of the second annular section of the outer shroud ring pattern to the first discontinuous layer of the second annular section of the outer shroud ring pattern, and interconnecting the layers of the second annular section of the outer shroud ring pattern to form at least a portion of the second annular section of the outer shroud ring pattern, said step of sequentially forming cross sectional layers of the second annular section of the outer shroud ring pattern includes forming a first annular layer of the second annular section of the outer shroud ring pattern, forming a second annular layer of the second annular section of the outer shroud ring pattern adjacent to the first annular layer of the second annular section of the outer shroud ring pattern, adhering the second annular layer of the second annular section of the outer shroud ring pattern to the first annular layer of the second annular section of the outer shroud ring pattern, forming a first discontinuous layer of the second annular section of the outer shroud ring pattern, forming a second discontinuous layer of the second annular section of the outer shroud ring pattern adjacent to the first discontinuous layer of the second annular section of the outer shroud ring pattern, adhering the second discontinuous layer of the second annular section of the outer shroud ring pattern to the first discontinuous layer of the second annular section of the outer shroud ring pattern, and interconnecting the layers of the second annular section of the outer shroud ring pattern to form at least a portion of the second annular section of the outer shroud ring pattern.

21. A method as set forth in claim 20 said step of positioning a first annular section of an outer shroud ring pattern on the assembly fixture includes positioning the first annular section of the outer shroud ring pattern on the assembly fixture with the first and second discontinuous layers of the first annular section of the outer shroud ring pattern facing in a direction away from the assembly fixture, said step of positioning a second annular section of the outer shroud ring pattern on the assembly fixture includes positioning the second annular section of the outer shroud ring pattern on the assembly fixture with the first and second discontinuous layers of the second annular section of the outer shroud ring pattern facing in a direction toward the assembly fixture.

22. A method as set forth in claim 16 wherein said step of positioning a plurality of airfoils in an annular array on the assembly fixture includes positioning each of the airfoils relative to a locating ramp disposed in an annular array of locating ramps on the assembly fixture.

23. A method as set forth in claim 16 further including the steps of moving a first plurality of retaining members disposed on the assembly fixture toward a radially outer side surface of the outer shroud ring pattern, moving a second plurality of retaining members disposed on the assembly fixture toward a radially inner side surface of the first annular section of the inner shroud ring pattern, gripping the first annular section of the outer shroud ring pattern with the first plurality of retaining members, and gripping the first annular section of the inner shroud ring pattern with the second plurality of retaining members.

24. A method as set forth in claim 16 further including the steps of operating first clamps to apply force against an annular axial end surface of the outer shroud ring pattern to hold the outer shroud ring pattern against movement relative to the assembly fixture, and operating second clamps to apply force against an annular axial end surface of the inner shroud ring pattern to hold the inner shroud ring pattern against movement relative to the assembly fixture.

25. A method as set forth in claim 16 wherein said step of positioning a plurality of airfoils in an annular array on the assembly fixture includes engaging each of the airfoils and at least one of first and second annular sections of the inner and outer shroud ring patterns to locate the airfoils relative to at least one of the first and second annular sections of at least one of the inner and outer shroud ring patterns.

26. A method of forming a turbine engine component having a plurality of airfoils disposed in an annular array between inner and outer shroud rings, said method comprising the steps of positioning a first annular section of an inner shroud ring pattern and a first annular section of an outer shroud ring pattern in a coaxial relationship with the first annular section of the outer shroud ring pattern extending around the first annular section of the inner shroud ring pattern, thereafter, positioning a plurality of airfoils in an annular array which is in a coaxial relationship with the first annular sections of the inner and outer shroud ring patterns, thereafter, positioning a second annular section of the inner shroud ring pattern in a coaxial relationship with the first annular section of the inner shroud ring pattern, positioning a second annular section of the outer shroud ring pattern in a coaxial relationship with the first annular section of the outer shroud ring pattern, thereafter, covering the first and second annular sections of the inner and outer shroud ring patterns with ceramic mold material, removing the first and second annular sections of the inner and outer shroud ring patterns from the covering of ceramic mold material to leave inner and outer shroud ring mold cavities, filling the inner and outer shroud ring mold cavities with molten metal, and solidifying the molten metal to form inner and outer shroud rings which are connected with radially inner and outer end portions of the airfoils.

27. A method as set forth in claim 26 further including the steps of forming at least one of the first and second annular sections of the inner shroud ring pattern by sequentially forming cross sectional layers of the one of the first and second annular sections of the inner shroud ring pattern and interconnecting the cross sectional layers of the one of the first and second annular sections of the inner shroud ring pattern, and forming at least one of the first and second annular sections of the outer shroud ring pattern by sequentially forming cross sectional layers of the one of the first and second annular sections of the outer shroud ring pattern and interconnecting the cross sectional layers of the one of the first and second annular sections of the outer shroud ring pattern.

28. A method as set forth in claim 26 wherein said step of positioning a second annular section of the inner shroud ring pattern in a coaxial relationship with the first annular section of the inner shroud ring pattern includes providing relative rotation between the first and second annular sections of the inner shroud ring pattern, said step of positioning second annular sections of the outer shroud ring pattern in a coaxial relationship with the first annular section of the outer shroud ring pattern includes providing relative rotation between the first and second annular sections of the outer shroud ring pattern.

29. A method as set forth in claim 26 wherein said step of positioning a first annular section of an inner shroud ring pattern and a first annular section of an outer shroud ring pattern in a coaxial relationship includes gripping a radially inwardly extending flange on the first annular section of the inner shroud ring pattern and gripping a radially outwardly extending flange on the first annular section of the outer shroud ring pattern to retain the first annular sections of the inner and outer shroud ring patterns against movement relative to each other.

30. A method as set forth in claim 29 wherein said step of positioning a second annular section of the inner shroud ring pattern in a coaxial relationship with the first annular section of the inner shroud ring pattern includes gripping the first and second annular sections of the inner shroud ring pattern with force which urges the first and second annular sections of the inner shroud ring pattern axially toward each other, said step of positioning a second annular section of the outer shroud ring pattern in a coaxial relationship with the first annular section of the outer shroud ring pattern includes gripping the first and second annular sections of the outer shroud ring pattern with force which urges the first and second annular sections of the outer shroud ring pattern axially toward each other.

31. A method of forming a turbine engine component having a plurality of a plurality of airfoils disposed in an annular array, said method comprising the steps of forming a first annular section of an inner shroud ring pattern by sequentially forming cross sectional layers of the first annular section of the inner shroud ring pattern and interconnecting the cross sectional layers of the first annular section of the inner shroud ring pattern, forming a first annular section of an outer shroud ring pattern by sequentially forming cross sectional layers of the first annular section of the outer shroud ring pattern and interconnecting the cross sectional layers of the first annular section of the outer shroud ring pattern, positioning the first annular section of the inner shroud ring pattern on an assembly fixture, positioning the first annular section of the outer shroud ring pattern on the assembly fixture, said steps of positioning the first annular section of the inner shroud ring pattern on the assembly fixture and positioning the first annular section of outer shroud ring pattern on the assembly fixture include positioning the first annular sections of the inner and outer shroud ring patterns in a coaxial relationship, gripping the first annular sections of the inner and outer shroud ring patterns with the assembly fixture to retain the first annular sections of the inner and outer shroud ring patterns in a coaxial relationship, positioning a plurality of airfoils in an annular array on the assembly fixture in a coaxial relationship with the first annular sections of the inner and outer shroud ring patterns, forming a second annular section of the inner shroud ring pattern by sequentially forming cross sectional layers of the second annular section of the inner shroud ring pattern and interconnecting the cross sectional layers of the second annular section of the inner shroud ring pattern, forming a second annular section of an outer shroud ring pattern by sequentially forming cross sectional layers of the second annular section of the outer shroud ring pattern and interconnecting the cross sectional layers of the second annular section of the outer shroud ring pattern, positioning the second annular section of the inner shroud ring pattern in a coaxial relationship with the first annular section of the inner shroud ring pattern while the first annular section of the inner shroud ring pattern is disposed on the assembly fixture in a coaxial relationship with the annular array of airfoils, and positioning the second annular section of the outer shroud ring pattern in a coaxial relationship with the first annular section of the outer shroud ring pattern while the first annular section of the outer shroud ring pattern is disposed on the assembly fixture in a coaxial relationship with the annular array of airfoils.

32. A method as set forth in claim 31 wherein said step of positioning the second annular section of the inner shroud ring pattern in a coaxial relationship with the first annular section of the inner shroud ring pattern includes rotating the second annular section of the inner shroud ring pattern relative to the first annular section of the inner shroud ring pattern, said step of positioning the second annular section of the outer shroud ring pattern in a coaxial relationship with the first annular section of the outer shroud ring pattern includes rotating the second annular section of the outer shroud ring pattern relative to the first annular section of the outer shroud ring pattern.

33. A method as set forth in claim 31 wherein said step of gripping the first annular sections of the inner and outer shroud ring patterns with the assembly fixture includes gripping a radially inwardly extending flange on the first annular section of the inner shroud ring pattern with the assembly fixture and gripping a radially outwardly extending flange on the first annular section of the outer shroud ring pattern with the assembly fixture.

34. A method of forming a turbine engine component having a plurality of airfoils disposed in an annular array between inner and outer shroud rings, said method comprising the steps of forming an inner shroud ring pattern by sequentially forming cross sectional layers of the inner shroud ring pattern and interconnecting the cross sectional layers of the inner shroud ring pattern, said step of forming an inner shroud ring pattern includes forming first and second annular inner shroud ring pattern sections, forming an outer shroud ring pattern by sequentially forming cross sectional layers of the outer shroud ring pattern and interconnecting the cross sectional layers of the outer shroud ring pattern, said step of forming an outer shroud ring pattern includes forming first and second annular outer shroud ring pattern sections, positioning the first annular inner shroud ring pattern section and the first annular outer shroud ring pattern section in a coaxial relationship, positioning a plurality of airfoils in an annular array with radially inner end portions of the airfoils adjacent the inner shroud ring pattern and radially outer end portions of the airfoils adjacent the outer shroud ring pattern, said step of positioning a plurality of airfoils in an annular array includes positioning the plurality of airfoils in an annular array which is disposed in a coaxial relationship with said first annular inner shroud ring pattern section and in a coaxial relationship with said first annular outer shroud ring pattern section, positioning the second annular inner shroud ring pattern section adjacent to the annular array of airfoils in a coaxial relationship with the first annular inner shroud ring pattern section, positioning the second annular outer shroud ring pattern section adjacent to the annular array of airfoils in a coaxial relationship with the first annular outer shroud ring pattern section, interconnecting the first and second annular inner shroud ring pattern sections, said step of interconnecting the first and second annular inner shroud ring pattern sections includes rotating one of the first and second annular inner shroud ring pattern sections relative to the other of the first and second annular inner shroud ring pattern sections, interconnecting the first and second annular outer shroud ring pattern sections, said step of interconnecting the first and second annular outer shroud ring pattern sections includes rotating one of the first and second annular outer shroud ring pattern sections relative to the other of the first and second annular outer shroud ring pattern sections, covering the inner and outer shroud ring patterns with ceramic mold material, removing the inner and outer shroud ring patterns from the covering of ceramic mold material to leave inner and outer shroud ring mold cavities having configurations corresponding to the configurations of the inner and outer shroud ring patterns, filling the inner and outer shroud ring mold cavities with molten metal, and solidifying the molten metal in the inner and outer shroud ring mold cavities to form inner and outer shroud rings which are connected to the radially inner and outer end portions of the airfoils.

35. A method of forming a turbine engine component having a plurality of airfoils disposed in an annular array between inner and outer shroud rings, said method comprising the steps of forming an inner shroud ring pattern by sequentially forming cross sectional layers of the inner shroud ring pattern and interconnecting the cross sectional layers of the inner shroud ring pattern, forming an outer shroud ring pattern by sequentially forming cross sectional layers of the outer shroud ring pattern and interconnecting the cross sectional layers of the outer shroud ring pattern, providing an assembly fixture, positioning a first annular portion of the inner shroud ring pattern on the assembly fixture, positioning a first annular portion of the outer shroud ring pattern on the assembly fixture, said steps of positioning first annular portions of the inner and outer shroud ring patterns on the assembly fixture include positioning the first annular portions of the inner and outer shroud ring patterns in a coaxial relationship, positioning a plurality of airfoils in an annular array with radially inner end portions of the airfoils adjacent the inner shroud ring pattern and radially outer end portions of the airfoils adjacent the outer shroud ring pattern, said step of positioning a plurality of airfoils in an annular array includes positioning the plurality of airfoils in an annular array on the assembly fixture with the annular array of airfoils in a coaxial relationship with the first annular portion of the inner shroud ring pattern and in a coaxial relationship with the first annular portion of the outer shroud ring pattern, thereafter, positioning a second annular portion of the inner shroud ring pattern on the assembly fixture, and positioning a second annular portion of the outer shroud ring pattern on the assembly fixture, said step of positioning a second annular portion of the inner shroud ring pattern on the assembly fixture includes engaging the first annular portion of the inner shroud ring pattern with the second annular portion of the inner shroud ring pattern and providing relative rotation between the first and second annular portions of the inner shroud ring pattern, said step of positioning a second annular portion of the outer shroud ring pattern on the assembly fixture includes engaging the first annular portion of the outer shroud ring pattern with the second annular portion of the outer shroud ring pattern and providing relative rotation between the first and second annular portions of the outer shroud ring pattern, covering the inner and outer shroud ring patterns with ceramic mold material, removing the inner and outer shroud ring patterns from the covering of ceramic mold material to leave inner and outer shroud ring mold cavities having configurations corresponding to the configurations of the inner and outer shroud ring patterns, filling the inner and outer shroud ring mold cavities with molten metal, and solidifying the molten metal in the inner and outer shroud ring mold cavities to form inner and outer shroud rings which are connected to the radially inner and outer end portions of the airfoils.

36. A method of forming a turbine engine component having a plurality of airfoils disposed in an annular array between inner and outer shroud rings, said method comprising the steps of forming an inner shroud ring pattern by sequentially forming cross sectional layers of the inner shroud ring pattern and interconnecting the cross sectional layers of the inner shroud ring pattern, said step of forming an inner shroud ring pattern includes forming a first inner shroud ring pattern section with an annular body portion and a plurality of projections which extend from the annular body portion and forming a second inner shroud ring pattern section with an annular body portion and a plurality of projections which extend from the annular body portion of the second inner shroud ring pattern section, and interconnecting the first and second inner shroud ring pattern sections by positioning the annular body portions of the first and second inner shroud ring pattern sections in a coaxial relationship with the projections on the first inner shroud ring pattern section at least partially disposed between projections on the second inner shroud ring pattern section and providing relative rotation between the first and second inner shroud ring pattern sections, forming an outer shroud ring pattern by sequentially forming cross sectional layers of the outer shroud ring pattern and interconnecting the cross sectional layers of the outer shroud ring pattern, positioning a plurality of airfoils in an annular array with radially inner end portions of the airfoils adjacent the inner shroud ring pattern and radially outer end portions of the airfoils adjacent the outer shroud ring pattern, covering the inner and outer shroud ring patterns with ceramic mold material, removing the inner and outer shroud ring patterns from the covering of ceramic mold material to leave inner and outer shroud ring mold cavities having configurations corresponding to the configurations of the inner and outer shroud ring patterns, filling the inner and outer shroud ring mold cavities with molten metal, and solidifying the molten metal in the inner and outer shroud ring mold cavities to form inner and outer shroud rings which are connected to the radially inner and outer end portions of the airfoils.

37. A method of forming a turbine engine component having a plurality of airfoils disposed in an annular array between inner and outer shroud rings, said method comprising the steps of forming an inner shroud ring pattern by sequentially forming cross sectional layers of the inner shroud ring pattern and interconnecting the cross sectional layers of the inner shroud ring pattern, forming an outer shroud ring pattern by sequentially forming cross sectional layers of the outer shroud ring pattern and interconnecting the cross sectional layers of the outer shroud ring pattern, said step of forming an outer shroud ring pattern includes forming a first outer shroud ring pattern section with an annular body portion and a plurality of projections which extend from the annular body portion and forming a second outer shroud ring pattern section with an annular body portion and a plurality of projections which extend from the annular body portion of the second outer shroud ring pattern section, and interconnecting the first and second outer shroud ring pattern sections by positioning the annular body portions of the first and second outer shroud ring pattern sections in a coaxial relationship with the projections on the first outer shroud ring pattern section at least partially disposed between projections on the second outer shroud ring pattern section and providing relative rotation between the first and second outer shroud ring pattern sections, positioning a plurality of airfoils in an annular array with radially inner end portions of the airfoils adjacent the inner shroud ring pattern and radially outer end portions of the airfoils adjacent the outer shroud ring pattern, covering the inner and outer shroud ring patterns with ceramic mold material, removing the inner and outer shroud ring patterns from the covering of ceramic mold material to leave inner and outer shroud ring mold cavities having configurations corresponding to the configurations of the inner and outer shroud ring patterns, filling the inner and outer shroud ring mold cavities with molten metal, and solidifying the molten metal in the inner and outer shroud ring mold cavities to form inner and outer shroud rings which are connected to the radially inner and outer end portions of the airfoils.

38. A method of forming a turbine engine component having a plurality of airfoils disposed in an annular array between inner and outer shroud rings, said method comprising the steps of positioning a first annular section of an inner shroud ring pattern on a support, positioning a first annular section of an outer shroud ring pattern on the support, thereafter, positioning a plurality of airfoils in an annular array on the support with the annular array of airfoils at least partially disposed between the first annular section of the inner shroud ring pattern and the first annular section of the outer shroud ring pattern, thereafter, positioning a second annular section of the inner shroud ring pattern on the support, said step of positioning a second annular section of the inner shroud ring pattern on the support includes providing relative movement between the first and second annular sections of the inner shroud ring pattern, and positioning the second annular section of the outer shroud ring pattern on the support, said step of positioning a second annular section of the outer shroud ring pattern on the support includes providing relative movement between the first and second annular sections of the outer shroud ring pattern, thereafter, interconnecting the first and second annular sections of the inner shroud ring pattern, interconnecting the first and second annular sections of the outer shroud ring pattern, thereafter, moving the inner and outer shroud ring patterns relative to the support with the annular array of airfoils at least partially disposed between inner and outer shroud ring patterns, covering the inner and outer shroud ring patterns with ceramic mold material, removing the inner and outer shroud ring patterns from the covering of ceramic mold material to leave inner and outer shroud ring mold cavities having configurations corresponding to the configurations of the inner and outer shroud ring patterns, filling the inner and outer shroud ring mold cavities with molten metal, and solidifying the molten metal in the inner and outer shroud ring mold cavities.

39. A method as set forth in claim 38 wherein said step of providing relative movement between the first and second annular sections of the inner shroud ring pattern includes rotating the second annular section of the inner shroud ring pattern relative to the first annular section of the inner shroud ring pattern, said step of providing relative movement between the first and second annular sections of the outer shroud ring pattern includes rotating the second annular section of the outer shroud ring pattern relative to the first annular section of the outer shroud ring pattern.

40. A method as set forth in claim 38 wherein said step of providing relative movement between the first and second annular sections of the inner shroud ring pattern includes providing relative to rotation between the first and second annular sections of the inner shroud ring pattern, said step of providing relative movement between the first and second annular sections of the outer shroud ring pattern includes providing relative rotation between the first and second annular sections of the outer shroud ring pattern.

41. A method as set forth in claim 38 wherein said step of providing relative movement between the first and second annular sections of the inner shroud ring pattern includes sliding a surface on the second annular section of the inner shroud ring pattern along a surface on the first annular section of the inner shroud ring pattern, said step of providing relative movement between the first and second annular sections of the outer shroud ring pattern includes sliding a surface on the second annular section of the outer shroud ring pattern along a surface on the first annular section of the outer shroud ring pattern.

42. A method as set forth in claim 38 further including the step of forming the first annular section of the inner shroud ring pattern by sequentially forming cross sectional layers of the first annular section of the inner shroud ring pattern and interconnecting the cross sectional layers of the first annular section of the inner shroud ring pattern, forming the second annular section of the inner shroud ring pattern by sequentially forming cross sectional layers of the second annular section of the inner shroud ring pattern and interconnecting the cross sectional layers of the second annular section of the inner shroud ring pattern, forming the first annular section of the outer shroud ring pattern by sequentially forming cross sectional layers of the first annular section of the outer shroud ring pattern and interconnecting the cross sectional layers of the first annular section of the outer shroud ring pattern, and forming the second annular section of the outer shroud ring pattern by sequentially forming cross sectional layers of the second annular section of the outer shroud ring pattern and interconnecting the cross sectional layers of the second annular section of the outer shroud ring pattern.

43. A method as set forth in claim 38 wherein said first and second sections of said inner shroud ring pattern and said first and second sections of said outer shroud ring pattern have an annular configurations, said steps of positioning first sections of the inner and outer shroud ring patterns on the support includes positioning the annular first sections of the inner and outer shroud ring patterns in a coaxial relationship, said step of positioning a plurality of airfoils in an annular array on the support includes positioning the annular array of airfoils in a coaxial relationship with first sections of the inner and outer shroud ring patterns, said step of positioning the second sections of the inner and outer shroud ring patterns on the support includes positioning the annular second sections of the inner and outer shroud ring patterns in a coaxial relationship with each other and with the annular first sections of the inner and outer shroud ring patterns.

44. A method as set forth in claim 38 wherein said steps of positioning first annular sections of the inner and outer shroud ring patterns on the support includes positioning the first annular sections of the inner and outer shroud ring patterns on an assembly fixture, said steps positioning second annular sections of the inner and outer shroud ring patterns on the support includes positioning the second annular sections of the inner and outer shroud ring patterns on the assembly fixture.

45. A method as set forth in claim 44 further including the step of retaining the first and second annular sections of the outer shroud ring and the first and second annular sections of the inner shroud ring against relative movement with the assembly fixture.

\* \* \* \* \*